(12) United States Patent
Michie, Jr. et al.

(10) Patent No.: US 8,679,602 B2
(45) Date of Patent: Mar. 25, 2014

(54) ETHYLENE-BASED POLYMERS AND COMPOSITIONS, METHODS OF MAKING THE SAME AND ARTICLES PREPARED THEREFROM

(75) Inventors: William J. Michie, Jr., Missouri City, TX (US); Sarah M. Hayne, Houston, TX (US); Sarah E. Patterson, Lake Jackson, TX (US); Robert James Jorgensen, Scott Depot, WV (US); Dale A. Wright, Charleston, WV (US)

(73) Assignee: Dow Global Technologies LLC, Midland, MI (US)

( * ) Notice: Subject to any disclaimer, the term of this patent is extended or adjusted under 35 U.S.C. 154(b) by 294 days.

(21) Appl. No.: 12/701,153

(22) Filed: Feb. 5, 2010

(65) Prior Publication Data
US 2010/0203277 A1     Aug. 12, 2010

Related U.S. Application Data

(60) Provisional application No. 61/150,472, filed on Feb. 6, 2009, provisional application No. 61/261,549, filed on Nov. 16, 2009.

(51) Int. Cl.
*B29D 22/00* (2006.01)

(52) U.S. Cl.
USPC .... 428/35.2; 428/35.7; 428/36.92; 526/348.2

(58) Field of Classification Search
USPC ................ 428/35.7, 35.2, 36.92; 526/348.2
See application file for complete search history.

(56) References Cited

U.S. PATENT DOCUMENTS 2,825,721 A   3/1958 Hogan et al.
3,023,203 A   2/1962 Dye (Continued)

FOREIGN PATENT DOCUMENTS

EP   0 640 625 A2   3/1995
EP   1574549 A1    9/2005

(Continued)

OTHER PUBLICATIONS

Randall, Rev. Macromol. Chem. Phys. C29 (2&3) 1989, 285-293.

(Continued)

*Primary Examiner* — Robert D. Harlan

(57) ABSTRACT

The invention provides an ethylene-based interpolymer comprising the following features:
  a) density from 0.910 to 0.930 g/cc;
  b) melt index (I2) from 0.1 to 0.5 g/10 min; and
  c) a high density fraction in an ATREF short chain branch distribution (SCBD) curve, eluting above 92° C., of greater than 10 percent to less than 28 percent of the total ATREF SCBD curve area.

The invention also provides a composition comprising an ethylene-based interpolymer that comprises the following features:
  a) a density from 0.919 to 0.928 g/cc;
  b) a melt index (I2) from 0.1 to 0.8 g/10 min; and
  c) a high density fraction in an ATREF short chain branch distribution (SCBD) curve, eluting above 92° C., of greater than 10 percent to less than 28 percent of the total ATREF SCBD curve area.

The invention also provides a hollow tube comprising at least one component formed from a composition comprising an ethylene-based interpolymer that comprises the following features:
  a) a density from 0.919 to 0.928 g/cc;
  b) a melt index (I2) from 0.1 to 0.8 g/10 min; and
  c) a high density fraction in an ATREF short chain branch distribution (SCBD) curve, eluting above 92° C., of greater than 10 percent to less than 28 percent of the total ATREF SCBD curve area; and
wherein the tube has a hydrostatic design basis (HDB) of at least 1000-psi at 23° C. per ASTM D-2837 regression method.

19 Claims, 9 Drawing Sheets

(56) References Cited

U.S. PATENT DOCUMENTS

| | | | |
|---|---|---|---|
| 3,622,251 | A | 11/1971 | Allen |
| 4,011,382 | A | 3/1977 | Levine et al. |
| 4,376,191 | A * | 3/1983 | Geck .......................... 526/102 |
| 4,528,790 | A | 7/1985 | Lo et al. |
| 4,798,081 | A | 1/1989 | Hazlitt et al. |
| 4,994,534 | A | 2/1991 | Rhee et al. |
| 5,089,321 | A | 2/1992 | Chum et al. |
| 5,221,570 | A | 6/1993 | Gokcen et al. |
| 5,272,236 | A | 12/1993 | Lai et al. |
| 5,278,272 | A | 1/1994 | Lai et al. |
| 5,317,036 | A * | 5/1994 | Brady et al. ............... 523/223 |
| 5,455,303 | A | 10/1995 | Panagopoulos, Jr. et al. |
| 5,462,999 | A | 10/1995 | Griffin et al. |
| 6,187,423 | B1 | 2/2001 | Maeger et al. |
| 6,355,733 | B1 | 3/2002 | Williams et al. |
| 6,469,103 | B1 | 10/2002 | Jain et al. |
| 6,682,793 | B1 * | 1/2004 | Small et al. ................ 428/35.7 |
| 7,202,313 | B2 | 4/2007 | Jorgensen et al. |
| 7,355,089 | B2 * | 4/2008 | Chang et al. ............... 604/358 |
| 7,498,282 | B2 * | 3/2009 | Patel et al. ................. 442/398 |
| 7,732,052 | B2 * | 6/2010 | Chang et al. ............. 428/424.8 |
| 7,790,826 | B2 * | 9/2010 | Wilson et al. .............. 526/352 |
| 1,031,851 | A1 | 12/2011 | Patterson et al. |
| 2005/0245689 | A1 | 11/2005 | Krishnaswamy et al. |
| 2006/0122362 | A1 | 6/2006 | Hoang et al. |
| 2007/0078225 | A1 | 4/2007 | Hoang et al. |
| 2007/0273066 | A1 | 11/2007 | Johansson et al. |
| 2010/0003439 | A1 * | 1/2010 | Michie et al. ............... 428/36.9 |
| 2010/0082256 | A1 * | 4/2010 | Mauldin et al. ................ 702/9 |
| 2010/0203277 | A1 * | 8/2010 | Michie et al. ............. 428/36.92 |
| 2010/0203311 | A1 * | 8/2010 | Michie, Jr. .................. 428/220 |

FOREIGN PATENT DOCUMENTS

| | | |
|---|---|---|
| WO | WO-01/98409 A1 | 12/2001 |
| WO | WO-2004/016688 A2 | 2/2004 |
| WO | WO-2005/097888 A1 | 10/2005 |
| WO | 2005/121239 A2 | 12/2005 |
| WO | WO-2006/067180 A1 | 6/2006 |
| WO | WO-2008/051824 A2 | 5/2008 |
| WO | WO-2008/153586 A1 | 12/2008 |
| WO | WO-2010/091256 A1 | 8/2010 |

OTHER PUBLICATIONS

Williams & Ward, J. Polym. Sci. Polym. Let. 6, 621 (1928).
Zimm, BH, J. Chem. Phys. 16, 1099 (1948).
Kratochvil P. Classical Light Scattering from Polymer Solutioins 113-136.
Mourey & Balke, Chromatog. Poly. Chpt. 12 (1992).
Balke, Thitiratsakul, Lew, Cheung & Mourey, Chromatog. Polym. Chpt. 13 (1992).
Yau and Gillespie, Polymer 42, 8947-8958 (2001).
Wild et al. J. of Polym. Sci. Poly. Phys. Ed. vol. 20, p. 441 (1982).

* cited by examiner

C4 V #3 (comparative)

—Relative Concentration

High Density Fraction = 6.1 %
Temperature Min. = 93.8 °C)
Purge = 14.2 %

C4 V #5 (comparative)

—Relative Concentration

High Density Fraction = 2.2 %
Temperature Min. = 96.0 °C)
Purge = 17.8 %

C4 V #6 (comparative)
— Relative Concentration
High Density Fraction = 5.5 %
Temperature Min. = 93.2 °C)
Purge = 17.9 %

C4 V #7 (comparative)
— Relative Concentration
High Density Fraction = 9.7 %
Temperature Min. = 92.3 °C)
Purge = 17.3 %

C6 XGMB-A (inventive)

— Relative Concentration

High Density Fraction = 21.1 %
Temperature Min. = 92.6 °C)
Purge = 11.3 %

C6 XGMB-C (inventive)

— Relative Concentration

High Density Fraction = 18.1 %
Temperature Min. = 93.5 °C)
Purge = 11.9 %

C6 XGMB-D (inventive)

— Relative Concentration

High Density Fraction = 20.1 %
Temperature Min. = 94.4 °C)
Purge = .9 %

C6 XGMB-E (inventive)

— Relative Concentration

High Density Fraction = 18.1 %
Temperature Min. = 92.4 °C)
Purge = 15.9 %

NT Resin (comparative)

— Relative Concentration

High Density Fraction = 8.9 %
Temperature Min. = 91.8 °C)
Purge = 17.5 %
MvAve = 53,405
SCB Mv = 58,358

0.3 LLDPE (inventive)

— Relative Concentration

High Density Fraction = 19.0 %
Temperature Min. = 93.5 °C)
Purge = 14.5 %
MvAve = 56,283
SCB Mv = 58,140

NT Resin (comparative)

0.3 LLDPE (inventive)

ETHYLENE-BASED POLYMERS AND COMPOSITIONS, METHODS OF MAKING THE SAME AND ARTICLES PREPARED THEREFROM

REFERENCE TO RELATED APPLICATIONS

This application claims the benefit of U.S. Provisional Application No. 61/150,472, filed Feb. 6, 2009, and fully incorporated herein by reference, and the benefit of U.S. Provisional Application No. 61/261,549, filed Nov. 16, 2009, and fully incorporated herein by reference.

BACKGROUND

Geomembranes are thick sheets for use in various applications like liquid containment, covers for reservoirs, water conveyance liners, landfill liners and caps. A LLDPE geomembrane for landfill caps must meet the Geosynthetic Research Institute, (GRI) requirements, such as tensile strength at break (psi or MPa), tensile elongation at break (%) and multi-axial requirements. In addition, the resin must process well, have good melt strength, preferably without blending with other resins, and have improved performance at lower cost.

International Publication No. WO 2006/067180 discloses a geo-membrane, produced by flat sheet extrusion or by blown sheet extrusion, with a bimodal resin consisting of medium density polyethylene (MDPE) having a density from 0.925 to 0.945 g/cc. In one embodiment, the MDPE resin is prepared by chemical blending using a single metallocene catalyst system in a double loop reactor.

U.S. Pat. No. 6,355,733 discloses a blend comprising a high molecular weight, medium density polyethylene (HMW, MDPE) and a linear low density polyethylene (LLDPE). The blend comprises from about 20 wt % to about 80 wt % of HMW MDPE. The HMW MDPE has a density from about 0.92 to about 0.944 g/cc, a melt index MI2 from about 0.01 to about 0.5 dg/min, and a melt flow ratio MFR from about 50 to about 300. The blend also comprises about 20 wt % to about 80 wt % of LLDPE. The LLDPE has a density within the range of about 0.90 to about 0.925 g/cc, and an MI2 within the range of about 0.50 to about 50 dg/min. The blend is disclosed as providing films with significantly improved toughness and tear strength, compared to MDPE or HDPE, and high modulus compared to LLDPE.

International Publication No. WO 2004/016688 discloses a polyethylene composition that has a density of about 0.945 to about 0.960 g/cc, and a melt flow index of about 0.1 to about 0.4. The composition is a melt blend of a linear low density polyethylene resin and/or a linear medium low density polyethylene resin, and a high density polyethylene resin.

U.S. Pat. No. 6,187,423 discloses a peroxide treated LLPDE material that can used as a geomembrane liner in land areas storing toxic waste, municipal landfills, leachate or slurry ponds, and other such land containment applications, as well as applications that require a strong, non-biodegradable material, which is impermeable to air and moisture.

Irrigation systems have evolved over the past 50-years from flood irrigation to the increased use of sprinklers and micro-irrigation systems. The main driver for such systems is the global focus on water conservation due to droughts, raising environmental awareness, and a high U.S. daily demand for water (billions of gallons each day).

There is a need for micro irrigation systems, based on cost-effective ethylene-based polymers, not costly post reactor blends or in-situ reactor blends, and which have sufficient or improved hydrostatic and mechanical properties. The typical ISO rated materials used are PE 32 and PE 40, which are both polyethylene based materials, or the PE 1404 resin per the American Standards Test Methods (ASTM).

Linear low density polyethylene (LLDPE) is preferred for micro tubing over high density polyethylene because of the lower flexural modulus. Micro tubing based on LLDPE can be "hole-punched" for efficient manipulation and repairs in the field of operation. In addition, the flexibility of tubing based on LLDPE allows for coiling of the tubing, without kinking, throughout the irrigated area. However, typical LLDPE resins need to be blended with higher density polyethylenes to improve hydrostatic strength.

U.S. Patent US20070273066A1 discloses a multimodal linear low density polyethylene composition for the preparation of a pressure pipe. The composition is prepared in-situ, and has a density of 910-940 kg/m3, an E-modulus in the range of less than 800 MPa, an abrasion resistance of less than 20, and a melt index (MFR2) of less than 2 g/10 min. This product requires multiple reactors to make the different LMW and HWM fractions for the final multimodal composition.

U.S. Pat. No. 5,455,303 discloses a polymer composition of the following: (A) a polyolefin composition consisting essentially of (i) a linear low density polyethylene and (ii) a copolymer of propylene with ethylene and/or a C4-C8 α-olefin, where R is an alkyl radical having 2 to 10 carbon atoms, and (B) a low density polyethylene. This composition comprises a blend of the two resins, which adds to the cost of this product.

International publication WO2005/097888A1 discloses a blend comprising from 70 to 98 weight percent of a chromium-based polyethylene resin, based on the total weight of the blend, and from 2 to 30 weight percent of a bimodal polyethylene resin having a density of from 0.940 to 0.965 g/cc, and an ESCR that is at least 10 times larger than that of a chromium-based resin of equivalent density, and prepared either with a Ziegler-Natta or with a metallocene catalyst system. The blend is disclosed as having improved environmental stress crack resistance and good processing behavior, with no loss of rigidity. Again, blending adds to the overall cost of the final resin.

Additional ethylene-based polymers, blends and/or compositions, and articles formed from such, are disclosed in International Publication Nos. WO 01/98409; WO 04/016688; WO 08/051,824; WO 08/153,586; U.S. Publication Nos. 2006/0122362; 2007/0078225; 2005/0245689; 2010/0003439; and U.S. Pat. Nos. 5,221,570; 6,187,423; and 6,355,733.

There is a need for cost-effective ethylene-based polymers that are not costly free-radical treated polymers or costly bimodal blends, and yet have sufficient or improved melt properties and mechanical properties for geomembrane applications. There is also a need for irrigation tubing formed from low cost ethylene-based polymers, not costly treated polymers or costly post reactor blends or in-situ blends, and which has sufficient or improved hydrostatic and mechanical properties for micro irrigation applications. These needs have been met by the following invention.

SUMMARY OF THE INVENTION

The invention provides an ethylene-based interpolymer comprising the following features:
a) a density from 0.910 to 0.930 g/cc;
b) a melt index (I2) from 0.1 to 0.5 g/10 min; and
c) a high density fraction in an ATREF short chain branch distribution (SCBD) curve, eluting above 92° C., of greater than 10 percent to less than 28 percent of the total ATREF SCBD curve area.

The invention also provides a composition comprising an ethylene-based interpolymer that comprises the following features:
a) a density from 0.919 to 0.928 g/cc;
b) a melt index (I2) from 0.1 to 0.8 g/10 min; and
c) a high density fraction in an ATREF short chain branch distribution (SCBD) curve, eluting above 92° C., of greater than 10 percent to less than 28 percent of the total ATREF SCBD curve area.

The invention also provides a hollow tube comprising at least one component formed from a composition comprising an ethylene-based interpolymer that comprises the following features:
a) a density from 0.919 to 0.928 g/cc;
b) a melt index (I2) from 0.1 to 0.8 g/10 min; and
c) a high density fraction in an ATREF short chain branch distribution (SCBD) curve, eluting above 92° C., of greater than 10 percent to less than 28 percent of the total ATREF SCBD curve area; and
wherein the tube has a hydrostatic design basis (HDB) of at least 1000-psi at 23° C. per ASTM D-2837 regression method.

DETAILED DESCRIPTION OF THE INVENTION

Figure 1:
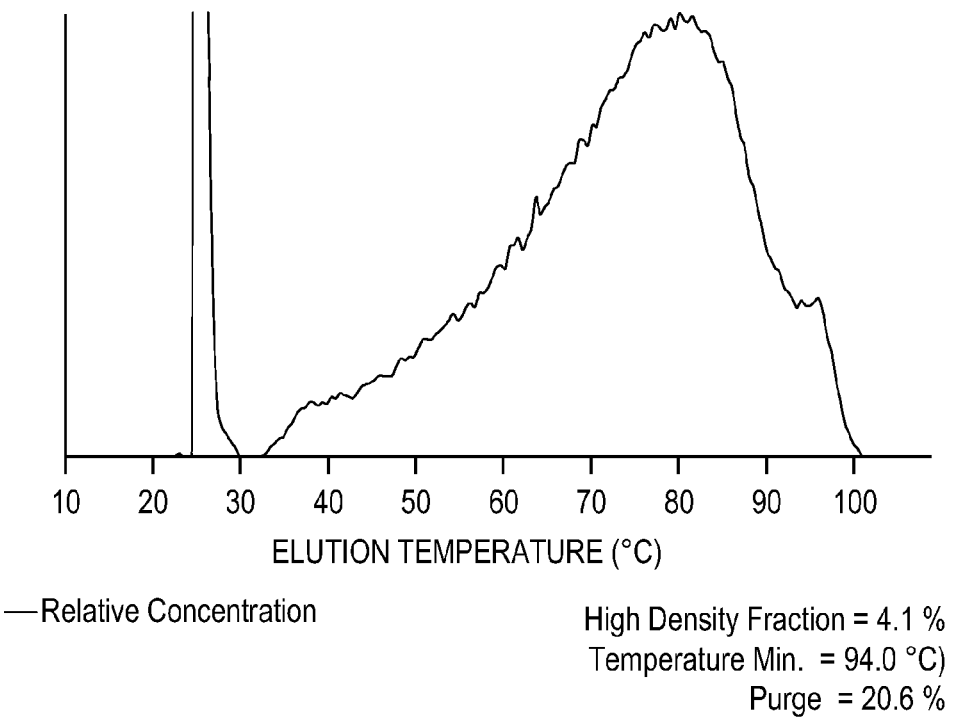
FIGS. 1-8 each depict an ATREF profile of a comparative resin.
Figure 2:
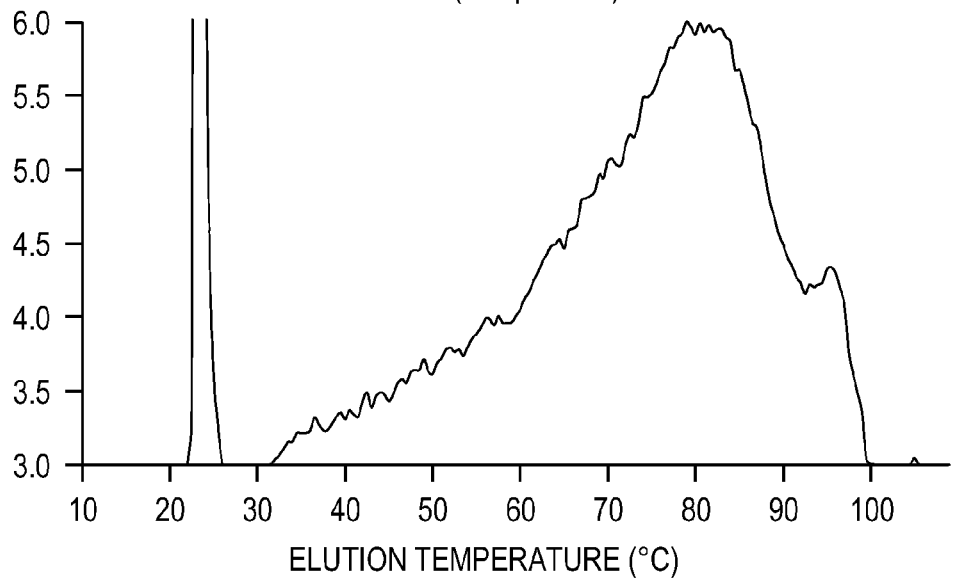
Figure 3:
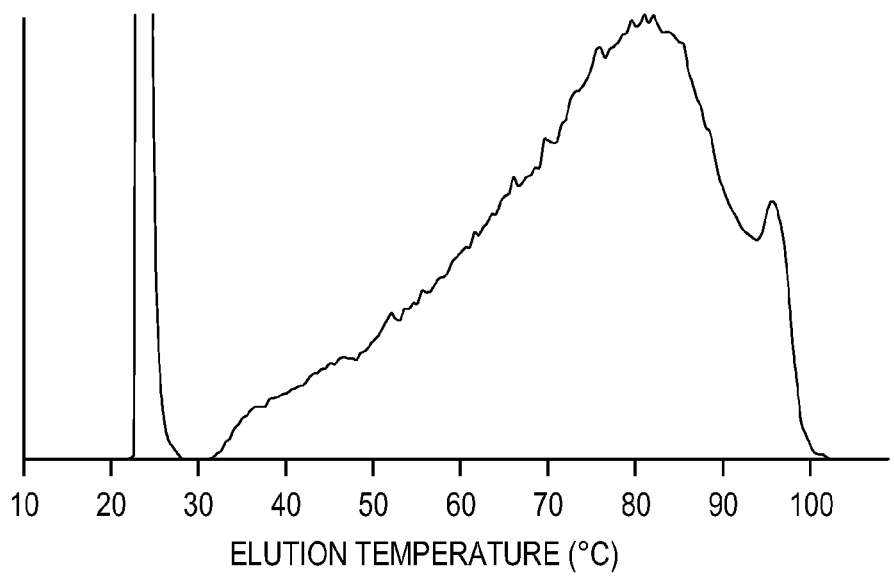
Figure 4:
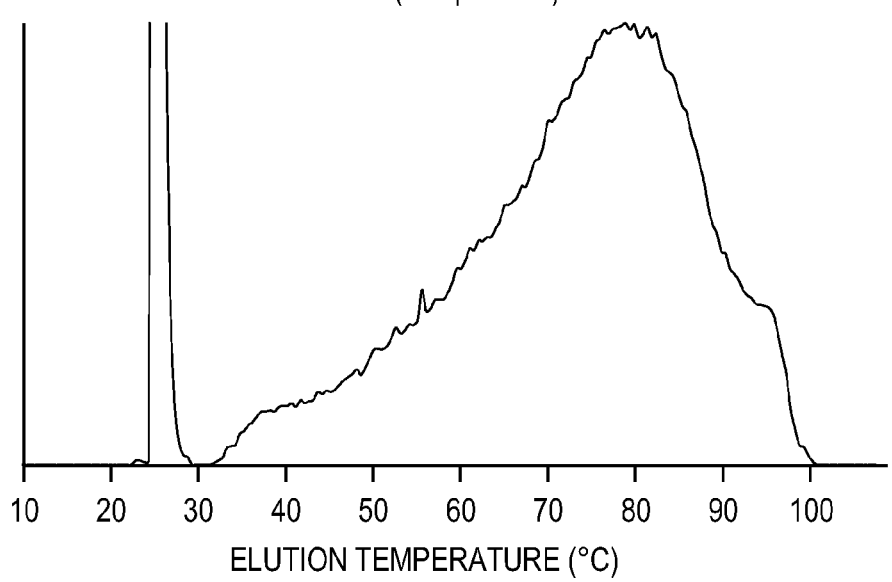
Figure 5:
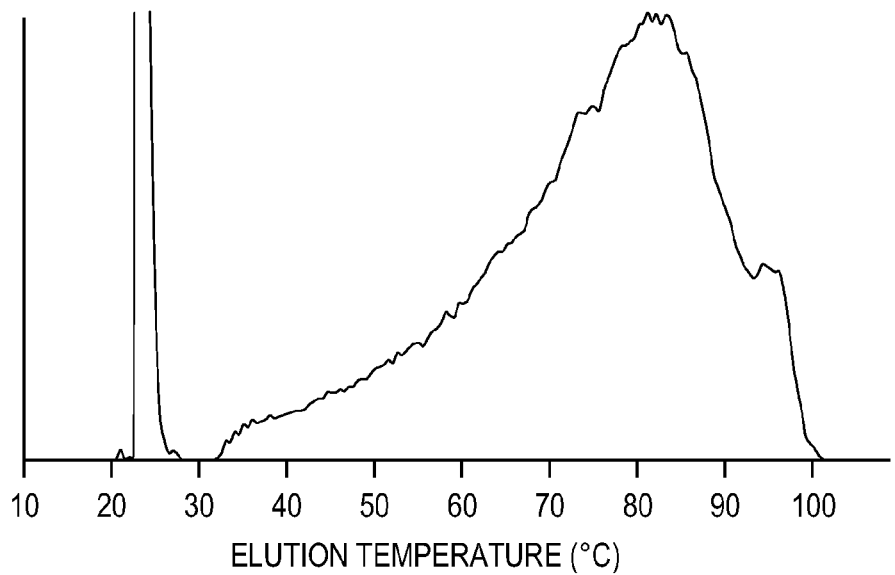
Figure 6:
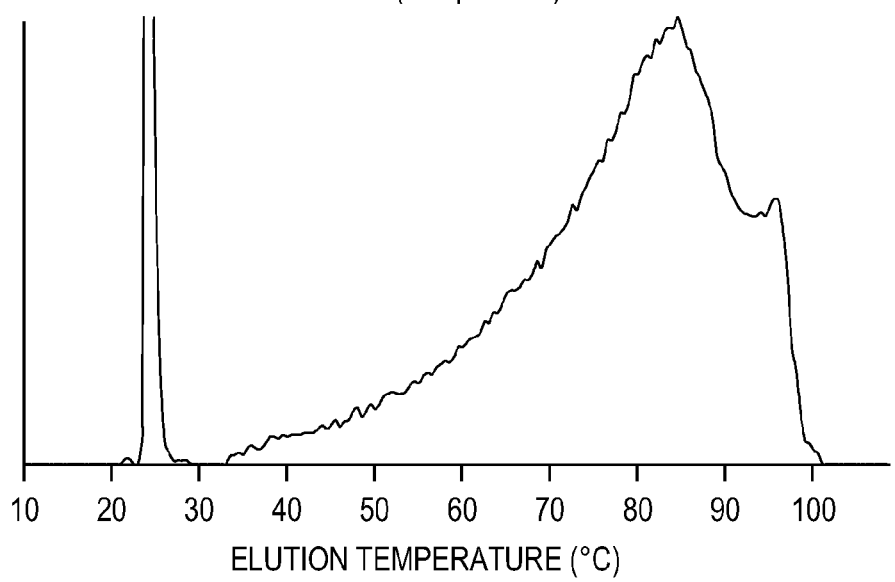
Figure 7:
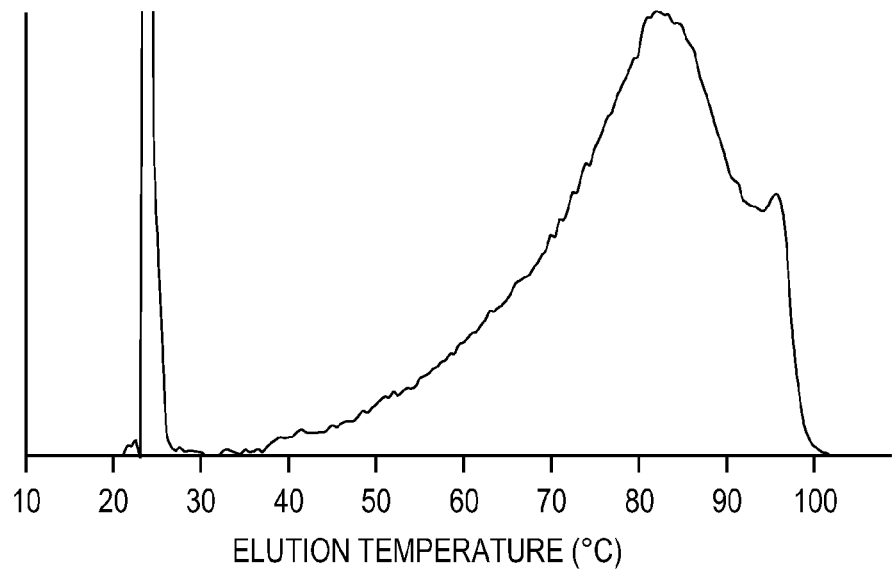
Figure 8:
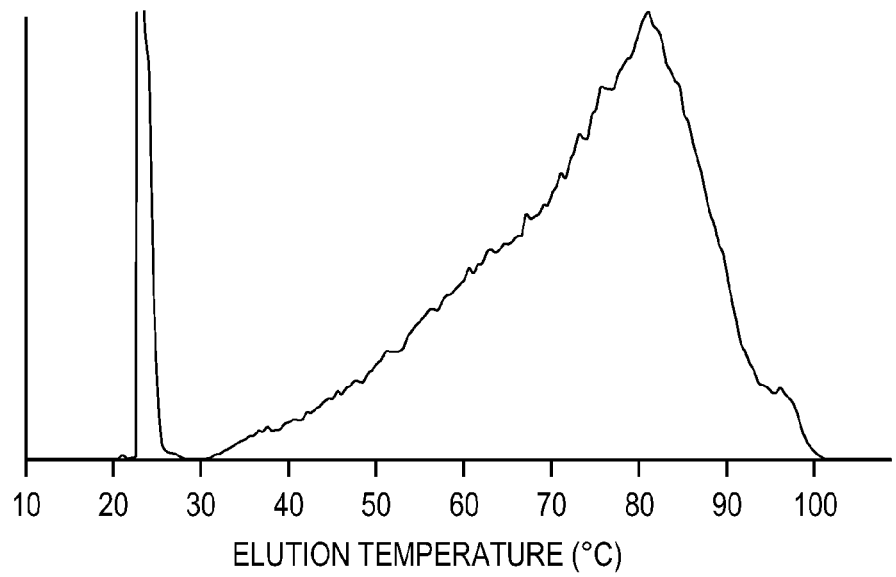
Figure 9:
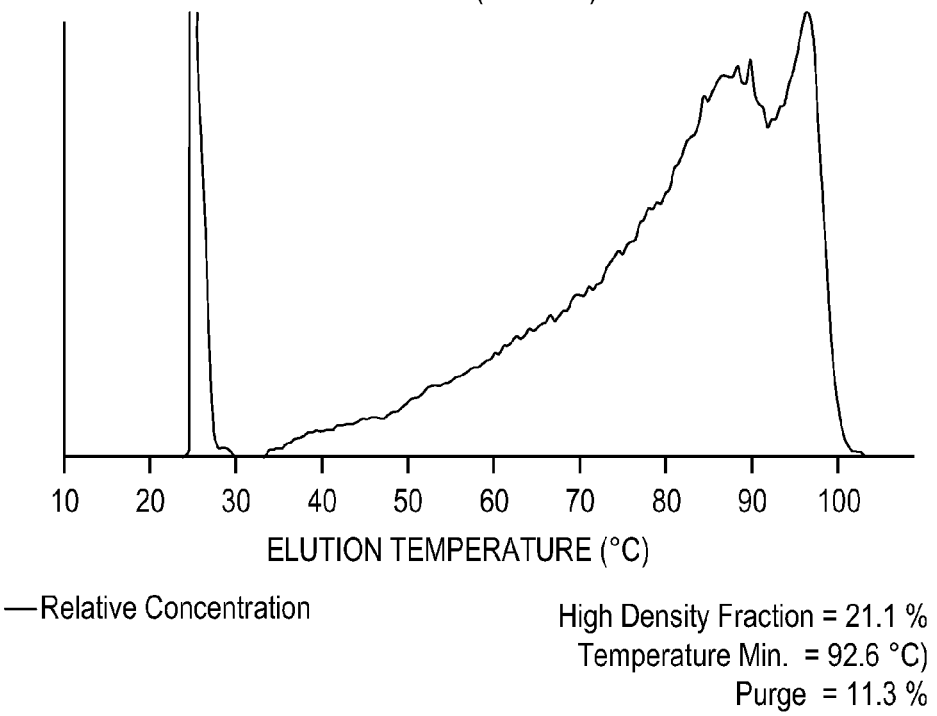
FIGS. 9-12 each depict an ATREF profile of an inventive resin.
Figure 10:
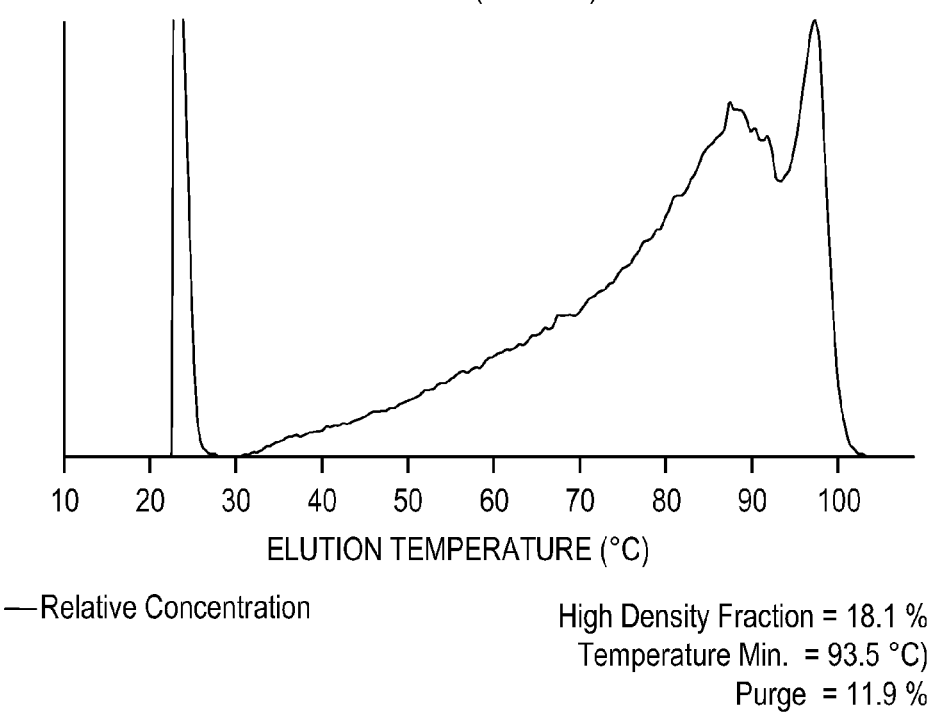
Figure 11:
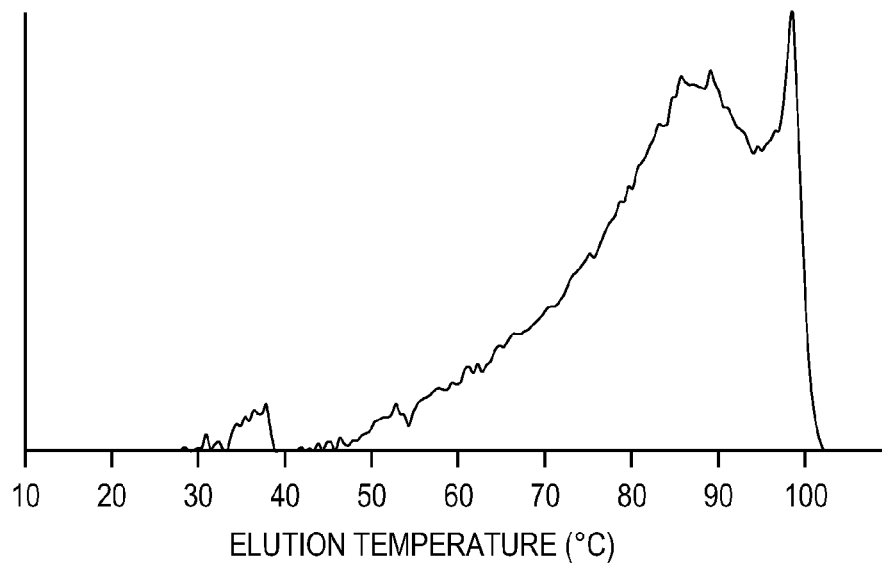
Figure 12:
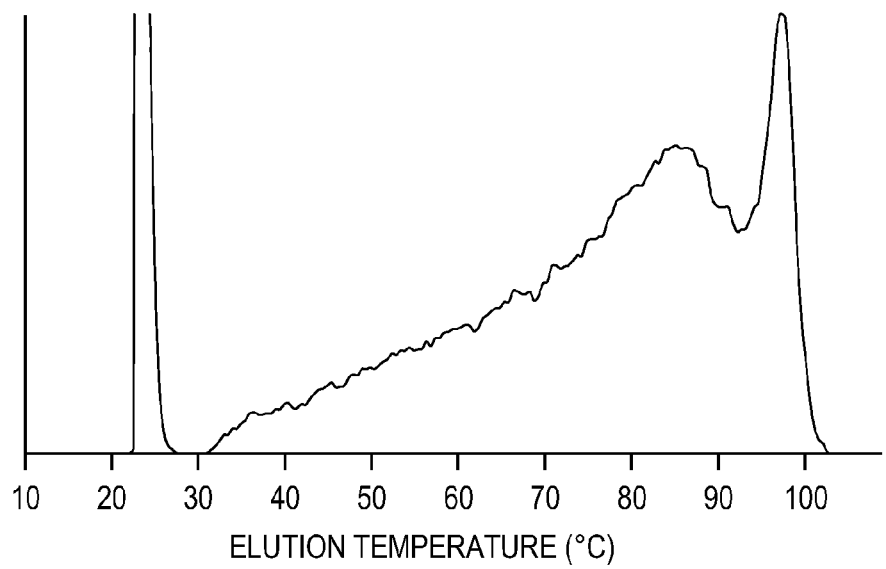
Figure 13:
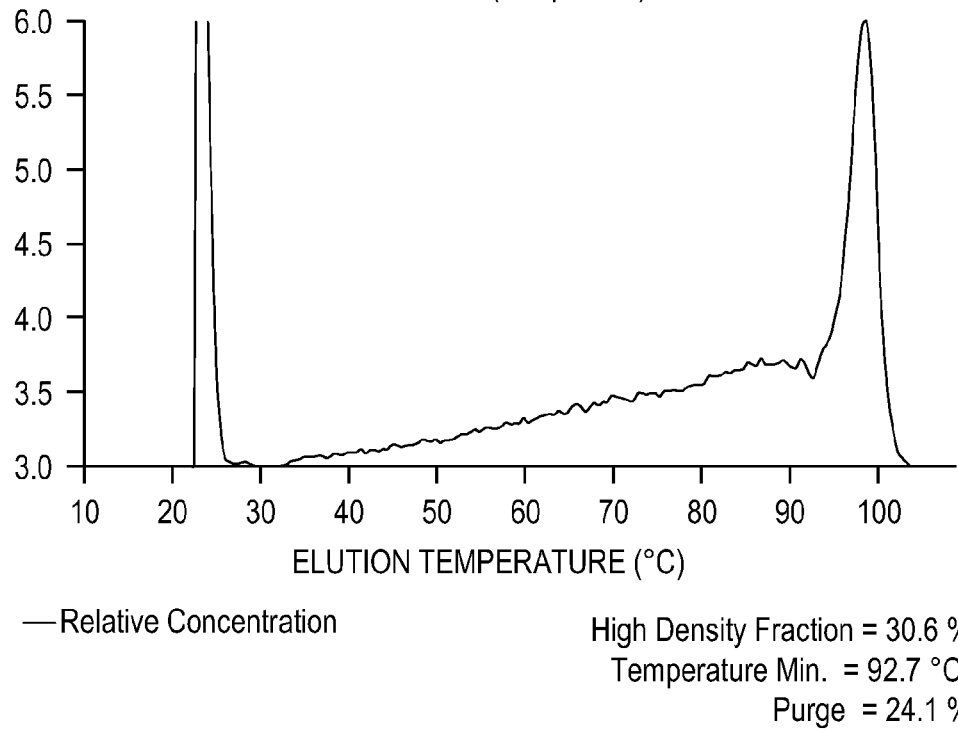
FIGS. 13-14 each depict an ATREF profile of a competitive resin.
Figure 14:
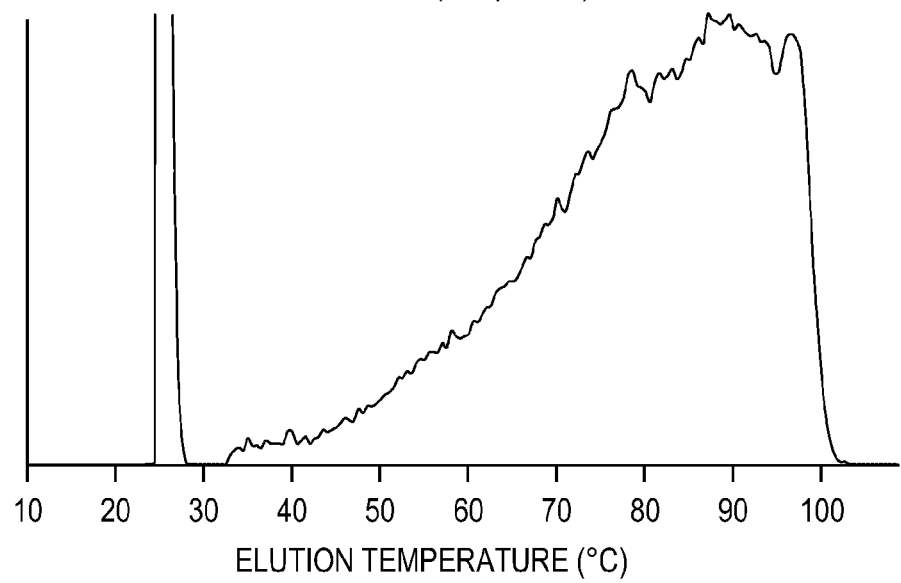

As discussed above, in a first aspect, the invention provides an ethylene-based interpolymer comprising the following features:
a) a density from 0.910 to 0.930 g/cc;
b) a melt index (I2) from 0.1 to 0.5 g/10 min; and
c) a high density fraction in an ATREF short chain branch distribution (SCBD) curve, eluting above 92° C., of greater than 10 percent to less than 28 percent of the total ATREF SCBD curve area.

In a second aspect, the invention also provides a composition comprising an ethylene-based interpolymer that comprises the following features:
a) a density from 0.919 to 0.928 g/cc;
b) a melt index (I2) from 0.1 to 0.8 g/10 min; and
c) a high density fraction in an ATREF short chain branch distribution (SCBD) curve, eluting above 92° C., of greater than 10 percent to less than 28 percent of the total ATREF SCBD curve area.

In a third aspect, the invention provides a hollow tube comprising at least one component formed from a composition comprising an ethylene-based interpolymer that comprises the following features:
a) a density from 0.919 to 0.928 g/cc;
b) a melt index (I2) from 0.1 to 0.8 g/10 min; and
c) a high density fraction in an ATREF short chain branch distribution (SCBD) curve, eluting above 92° C., of greater than 10 percent to less than 28 percent of the total ATREF SCBD curve area; and
wherein the tube has a hydrostatic design basis (HDB) of at least 1000-psi at 23° C. per ASTM D-2837 regression method.

The total ATREF SCBD curve area includes the purge fraction, the SCBD fraction and the high density fraction.

The following embodiments apply to all aspects of the invention.

In one embodiment, the ethylene-based interpolymer is polymerized using a chrome catalyst, and preferably a CrO catalyst and more preferably a titanium and fluorine modified CrO catalyst.

In one embodiment, the high density fraction elutes above 92° C. and below 150° C.

In one embodiment, the high density fraction is greater than 12 percent and preferably greater than 15 percent of the total ATREF SCBD curve area.

In one embodiment, the high density fraction is less than, or equal to, 26 percent of the total ATREF SCBD curve area.

In one embodiment, the high density fraction is greater than 12 percent to less than 26 percent of the total ATREF SCBD curve area, and preferably greater than 15 percent to less than 23 percent of the total ATREF SCBD curve area.

In one embodiment, the interpolymer has a SCBD profile (relative to the high density fraction and the SCBD fraction) that has a high density fraction of peak height greater than, or equal to (and preferably greater than), the peak height (maximum peak height or peak height at maximum intensity) of the SCBD fraction, and the profile exhibits distinct bimodality at temperatures higher than the temperature of the purge faction peak (eluting from around 35° C.-30° C. and lower), and where the SCBD fraction elutes before (at lower temperatures) the high density fraction. Here, distinct bimodality means that the peak height at maximum intensity of the SCBD fraction is greater than, or equal to, 85 percent, preferably greater than, or equal to, 90 percent of the peak height at maximum intensity of the high density fraction. In a further embodiment, the SCBD fraction begins to elute at a temperature less than 40° C., preferably less than 35° C.

In one embodiment, the interpolymer has a SCBD profile (relative to the high density fraction and the SCBD fraction) that has a high density fraction of peak height greater than, or equal to, (and preferably greater than) the peak height (maximum peak height) of the SCBD fraction, and the profile exhibits distinct bimodality at temperatures higher than the temperature of the purge fraction peak (eluting from around 35° C.-30° C. and lower), and where the SCBD fraction elutes before (at lower temperatures) the high density fraction. Here, distinct bimodality means that the peak height at maximum intensity of the SCBD fraction is greater than, or equal to, 75 percent, preferably greater than, or equal to, 80 percent of the peak height at maximum intensity of the high density fraction. In a further embodiment, the SCBD fraction begins to elute at a temperature less than 40° C., preferably less than 35° C.

In one embodiment, the interpolymer has a SCBD curve that has a high density fraction of higher peak height than the peak height of the SCBD fraction, and the SCBD curve exhibits distinct bimodality at temperatures higher than the temperature of the purge faction peak (from 35° C. to 105° C.), where the high density fraction elutes in the range from 92° C. to 105° C., and the SCBD fraction elutes in the range from 80° C. to 91° C. Here distinct bimodality means that the relative minimum value between the high density fraction peak and the SCBD peak is greater than, or equal to, 90 percent of the peak height of the high density fraction.

In one embodiment, the interpolymer has a SCBD curve that has a high density fraction of higher peak height than the peak height of the SCBD fraction, and the SCBD curve exhibits distinct bimodality at temperatures higher than the temperature of the purge faction peak (from 35° C. to 105° C.), where the high density fraction elutes in the range from 92° C. to 105° C., and the SCBD fraction elutes in the range from 80° C. to 91° C. Here, distinct bimodality means that the relative minimum value between the high density fraction peak and the SCBD peak is greater than, or equal to, 80 percent of the peak height of the high density fraction.

In one embodiment, the ethylene-based interpolymer is a linear interpolymer.

In one embodiment, the ethylene-based interpolymer is a heterogeneously branched linear interpolymer.

In one embodiment, the ethylene-based interpolymer is an ethylene/α-olefin interpolymer. In a further embodiment, the α-olefin is selected from the group consisting of C6 to C10 α-olefins. In a further embodiment, the α-olefin is selected from the group consisting of 1-hexene, 1-heptene, 1-octene, 1-nonene and 1-decene, preferably 1-hexene and 1-octene, and more preferably 1-hexene.

In one embodiment, the interpolymer has an absolute molecular weight distribution, Mw/Mn, greater than, or equal to, 8, preferably greater than, or equal to, 10, as determined by GPC.

In one embodiment, the interpolymer has an absolute molecular weight distribution, Mw/Mn, greater than 11.5, as determined by GPC.

In one embodiment, the interpolymer has an absolute molecular weight distribution, Mw/Mn, less than, or equal to, 20, preferably less than, or equal to, 15, as determined by GPC.

In one embodiment, the interpolymer has a molecular weight distribution (Mw/Mn) from 10 to 16, preferably from 12 to 15, as determined by conventional GPC.

In one embodiment, the interpolymer has an Mw/Mn, via conventional GPC, from "greater than 11" to 14.5.

In one embodiment, the interpolymer has an absolute Z average molecular weight, Mz, greater than 640,000, and an absolute Z+1 average molecular weight, Mz+1 greater than 3,000,000 g/mole, as determined by GPC.

In one embodiment, the interpolymer has an absolute Z average molecular weight, Mz, greater than 680,000 g/mole, preferably greater than 720,000 g/mole, and an absolute Z+1 average molecular weight, Mz+1, greater than 3,500,000 g/mole, preferably greater than 4,000,000 g/mole, as determined by GPC.

In one embodiment, the interpolymer has an absolute Mz/Mw ratio greater than 5.9, and an absolute Mz+1/Mw ratio greater than 30, as determined by GPC.

In one embodiment, the interpolymer has an absolute Mz/Mw ratio greater than 5.9, and an absolute Mz+1/Mw ratio greater than 33, preferably greater than 35, as determined by GPC.

In one embodiment, the interpolymer has an I21/I2 ratio greater than, or equal to, 50, preferably greater than, or equal to, 55, more preferably greater than, or equal to, 60.

In one embodiment, the interpolymer has an I21/I2 ratio greater than, or equal to, 70, preferably greater than, or equal to, 75, more preferably greater than, or equal to, 80.

In one embodiment, the interpolymer has an I21/I2 ratio greater than, or equal to, 80, preferably greater than, or equal to, 90, more preferably greater than, or equal to, 95.

In one embodiment, the interpolymer has an I21/I2 ratio less than, or equal to, 150, preferably less than, or equal to, 130, more preferably less than, or equal to, 120.

In one embodiment, the interpolymer has an I21/I2 ratio less than, or equal to, 120, preferably less than, or equal to, 110, and more preferably less than, or equal to, 100.

In one embodiment, the interpolymer has an I21/I2 ratio from 50 to 120, preferably from 55 to 110, and more preferably from 60 to 100.

In one embodiment, the interpolymer has an I21/I2 ratio from 80 to 150, preferably from 90 to 130, and more preferably from 95 to 120.

In one embodiment, the interpolymer has an I10/I2 ratio greater than, or equal to, 10, preferably greater than, or equal to, 15.

In one embodiment, the interpolymer has an I10/I2 ratio less than, or equal to, 30, preferably less than, or equal to, 25.

In one embodiment, the interpolymer has an I10/I2 ratio from 10 to 30, preferably from 15 to 25.

In one embodiment, the interpolymer has an I5/I2 ratio greater than, or equal to, 3, preferably greater than, or equal to, 4.

In one embodiment, the interpolymer has an I5/I2 ratio less than, or equal to, 10, preferably less than, or equal to, 7.

In one embodiment, the interpolymer has an I5/I2 ratio from 3 to 10, preferably from 4 to 7, and more preferably from 4 to 6.

In one embodiment, the interpolymer has a viscosity ratio ($\eta_{0.01}/\Theta_{100}$) greater than, or equal to, 44, preferably greater than, or equal to, 50, more preferably greater than, or equal to, 55, and even more preferably greater than, or equal to, 60.

In one embodiment, the interpolymer has a viscosity ratio ($\eta_{0.01}/\eta_{100}$) from 40 to 80, preferably from 45 to 75.

In one embodiment, the interpolymer has a flexural modulus from 60,000 psi to 100,000 psi.

In one embodiment, the interpolymer has a viscosity ratio ($\eta_{0.01}/\eta_{100}$) greater than 44, preferably greater than, or equal to, 50, more preferably greater than, or equal to, 55, and even more preferably greater than, or equal to, 60; and a flexural modulus from 60,000 psi to 100,000 psi.

In one embodiment, the interpolymer has a tan delta ratio (tan delta$_{0.01\ rad}$/tan delta$_{100\ rad}$) from 2.5 to 3.2.

In one embodiment, the interpolymer has a melting temperature, Tm, from 115° C. to 130° C., preferably from 120° C. to 125° C., as determined by DSC.

In one embodiment, the interpolymer has a crystallization temperature, Tc, from 105° C. to 120° C., preferably from 108° C. to 115° C., as determined by DSC.

In one embodiment, the interpolymer has heat of fusion from 140 J/g to 165 J/g, preferably from 144 J/g to 165 J/g, as determined by DSC.

In one embodiment, the interpolymer has heat of crystallization from 148 J/g to 162 J/g, preferably from 150 J/g to 162 J/g, as determined by DSC.

The ethylene-based interpolymer is not formed by a free-radical modification process, such as, for example, a peroxide modification process.

The ethylene-based interpolymer is not formed by an in-situ reaction blending of two or more polymers, and is not formed from a post-reactor blending of two or more polymers.

The ethylene-based interpolymer is not 1) formed by a free-radical modification process, such as, for example, a peroxide modification process, and/or is not 2) formed by an in-situ reaction blending of two or more polymers or from a post-reactor blending of two or more polymers.

An inventive interpolymer may comprise a combination of two or more embodiments as described herein.

The invention also provides a composition comprising an inventive interpolymer.

An inventive composition may further comprise one or more additives. In one embodiment, the one or more additives are selected from the group consisting of light stabilizers, hindered amines, hindered phenols, metal deactivators, UV absorbers, phosphites, acid neutralizers, processing aids, lubricants, anti-blocking additives, slip additives, antistatic additives, antimicrobial additives, chemical blowing agents, colorants, fillers, and combinations thereof.

In one embodiment, an inventive composition comprises greater than 80 weight percent, preferably greater than 90 weight percent, and more preferably greater than 95 weight percent, of the ethylene-based interpolymer, based on the total weight of the composition.

An inventive composition may comprise a combination of two or more embodiments as described herein.

The invention also provides an article comprising at least one component formed from an inventive interpolymer.

The invention also provides an article formed from an inventive interpolymer.

The invention also provides an article formed from an inventive composition.

The invention also provides an article comprising at least one component formed from an inventive composition.

In one embodiment, the article has a percent elongation greater than, or equal to, 700 percent, preferably greater than, or equal to, 720 percent, and more preferably greater than 745 percent and most preferably greater than 770 percent as determined by ASTM D-638-03, at 23° C., using a type IV specimen made form a compression molded plaque in accordance with ASTM D-4703-00 Annexes A1-A7 and procedure C for the appropriate type of resin, based on its density according to Annex section A1.5.6.3. The pull rate was two inches per minute.

In one embodiment, the article is a sheet. In a further embodiment, the thickness of the sheet is from 10 mils to 200 mils, preferably from 20 mils to 150 mils. In another embodiment, the thickness of the sheet is greater than, or equal to, 40 mils.

In one embodiment, the sheet has a percent elongation greater than, or equal to, 800 percent, preferably greater than, or equal to 820 percent, and more preferably greater that 845 percent, and most preferably greater that 870 percent, in both the MD and TD directions on the sheet, as determined by ASTM D-6693 tensile testing using a type IV specimen per ASTM D-638. MD is defined as the machine direction in the sheet and TD is the transverse direction of the sheet, sometime called the cross direction.

In one embodiment, the article is a geomembrane. In a further embodiment, the thickness of the geomembrane is from 20 mils to 120 mils. In another embodiment, the thickness of the geomembrane is greater than, or equal to, 40 mils.

In one embodiment, the geomembrane has a percent elongation greater than, or equal to, 800 percent, preferably greater than, or equal to 820 percent, and more preferably greater that 845 percent, and most preferably greater that 870 percent, in both the MD and TD directions on the geomembrane, as determined by ASTM D-6693 tensile testing using a type IV specimen per ASTM D-638. MD is defined as the machine direction in the geomembrane and TD is the transverse direction of the geomembrane, sometime called the cross direction.

In one embodiment, the article is a blow molded article.

In one embodiment, the article is an injection molded article.

In one embodiment, the article is a pipe.

An inventive article may comprise a combination of two more embodiments as described herein.

It has been discovered that linear low density ethylene-based interpolymers, preferably prepared with a chromium catalyst, and having certain ATREF features and certain melt index (I2) and density, have increased processability and surprisingly excellent melt strength. These properties are achieved without the need to blend such interpolymers chemically or physically, or to cross-link or chemically modify such interpolymers. These interpolymers are particularly suitable for geomembrane applications (e.g. landfill caps, pond liners). In addition, sheets formed from the inventive interpolymers have excellent tensile performance, and these properties are observed with interpolymers containing lower comonomer incorporation.

In one embodiment of the third aspect of the invention, the tube has a HDB of 1000 psi at 23° C. for the Long Term Hydrostatic Stress (LTHS) at 100,000 hours (11.42 years).

In one embodiment of the third aspect of the invention, the tube has a LTHS greater than, or equal to, 960 psi.

In one embodiment of the third aspect of the invention, the tube has a LTHS less than, or equal to, 1200-psi.

In one embodiment of the third aspect of the invention, the hollow tube is selected from the group consisting of flexible tubing, pipes, hoses, inner tubes, drip tubing and micro irrigation tubing.

In one embodiment of the third aspect of the invention, the tube is a pipe.

In one embodiment of the third aspect of the invention, the tube is a micro irrigation tube.

In one embodiment of the third aspect of the invention, the tube is a drip tube.

In one embodiment of the third aspect of the invention, the thickness of the tubing is from preferably from 3 mils to 70 mils, more preferably from 5 mils to 65 mils and most preferably from 10 mils to 60 mils. In another embodiment, the thickness of the tubing is greater than, or equal to 3 mils, preferably greater than, or equal to, 5 mils.

An inventive hollow tube may comprise a combination of two more embodiments as described herein.

It has been discovered that tubes formed from linear low density ethylene-based interpolymers that have certain ATREF features and a selected combination of melt index (I2) and density, have improved hydrostatic performance, without the need to blend these interpolymers with other polymers. These interpolymers are preferably prepared with a chromium catalyst. These tubes are particularly suitable for micro irrigation tubing applications.

Ethylene-Based Interpolymer

The ethylene-based interpolymer has a density greater than, or equal to, 0.910 g/cc, preferably greater than, or equal to, 0.915 g/cc, and more preferably greater than, or equal to, 0.918 g/cc (1 cc=1 cm$^3$). In another embodiment, the ethylene-based interpolymer has a density less than, or equal to, 0.930 g/cc, preferably less than, or equal to, 0.928 g/cc, and more preferably less than, or equal to 0.927 g/cc. In another embodiment, the density of the ethylene-based interpolymer is in the range from 0.910 to 0.930 g/cc, and preferably in the range from 0.915 to 0.925 g/cc and most preferably from 0.919 to 0.923 g/cc range.

In one embodiment, the ethylene-based interpolymer has a density greater than, or equal to, 0.919 g/cc, preferably greater than, or equal to, 0.9195 g/cc, and more preferably greater than, or equal to, 0.920 g/cc. In another embodiment, the ethylene-based interpolymer has a density less than, or equal to, 0.928 g/cc, preferably less than, or equal to, 0.9275 g/cc, and more preferably less than, or equal to 0.927 g/cc.

The ethylene-based interpolymer has a melt index, I2, (190° C., 2.16 kg weight, ASTM 1238-04) greater than, or equal to, 0.10, preferably greater than, or equal to, 0.15, and more preferably greater than, or equal to, 0.17 (units of grams per 10 minutes). In another embodiment, the ethylene-based interpolymer has a melt index, I2, less than, or equal to, 0.5, preferably less than, or equal to, 0.45, and more preferably less than, or equal to, 0.4. In yet another embodiment, the I2 ranges from 0.10 to 0.5 grams per 10 minutes, preferably from 0.15 to 0.45 grams per 10 minutes, and most preferably from 0.2 to 0.4 grams per 10 minutes.

In one embodiment, the ethylene-based interpolymer has a melt index, I2, (190° C., 2.16 kg weight, ASTM 1238-04) greater than, or equal to, 0.10, preferably greater than, or equal to, 0.15, and more preferably greater than, or equal to, 0.17 (units of grams per 10 minutes). In another embodiment, the ethylene-based interpolymer has a melt index, I2, less than, or equal to, 0.80 preferably less than, or equal to, 0.70, and more preferably less than, or equal to, 0.6. In yet another embodiment, the I2 ranges from 0.10 to 0.80 grams per 10 minutes, preferably from 0.15 to 0.70 grams per 10 minutes, and most preferably from 0.17 to 0.60 grams per 10 minutes.

In one embodiment, the ethylene-based interpolymer has a density from 0.915 g/cc to 0.928 g/cc, and a melt index, I2, from 0.2 g/10 min to 0.4 g/10 min, and preferably from 0.22 g/10 min to 0.38 g/10 min.

In one embodiment, the ethylene-based interpolymer is an ethylene/α-olefin interpolymer, and preferably an ethylene/α-olefin copolymer. In a further embodiment, the α-olefin is a C6-C20 α-olefin, preferably a C6-C10 α-olefin, and more preferably a C6-C8 α-olefin. Preferred α-olefins include 1-hexene, 1-heptene, 1-octene, 1-nonene and 1-decene. Especially preferred α-olefins include 1-hexene and 1-octene, and most preferably 1-hexene. Preferred copolymers include ethylene/hexene-1 (EH) copolymers and ethylene/octene-1 (EO) copolymers.

In a preferred embodiment, the ethylene-based interpolymer is an ethylene/1-hexene interpolymer, and preferably an ethylene/1-hexene copolymer. In a further embodiment, the ethylene/1-hexene copolymer has a mole percentage of 1-hexene from 2.0 to 3.5, and preferably from 2.1 to 3.4 and most preferably from 2.2 to 3.3, based on the amount of polymerized monomers.

In a preferred embodiment, the ethylene-based interpolymer is a linear ethylene-based interpolymer, and preferably a heterogeneously branched linear ethylene-based interpolymer. The term "linear ethylene-based interpolymer," as used herein, refers to an interpolymer that lacks long-chain branching, or lacks measurable amounts of long chain branching, as determined by techniques known in the art, such as NMR spectroscopy (for example 1C NMR as described by Randall, Rev. Macromal. Chem. Phys., C29 (2&3), 1989, pp. 285-293, incorporated herein by reference). Some examples of long-chain branched interpolymers are described in U.S. Pat. Nos. 5,272,236 and 5,278,272. As known in the art, the heterogeneously branched linear and homogeneously branched linear interpolymers have short chain branching due to the incorporation of comonomer into the growing polymer chain.

Heterogeneously branched interpolymers have a branching distribution, in which the polymer molecules do not have the same comonomer-to-ethylene ratio. For example, heterogeneously branched LLDPE polymers typically have a distribution of branching, including a highly branched portion (similar to a very low density polyethylene), a medium branched portion (similar to a medium branched polyethylene) and an essentially linear portion (similar to linear homopolymer polyethylene). These linear interpolymers lack long chain branching, or measurable amounts of long chain branching, as discussed above.

The terms "homogeneous" and "homogeneously-branched" are used in reference to an ethylene/α-olefin polymer (or interpolymer), in which the α-olefin comonomer is randomly distributed within a given polymer molecule, and all of the polymer molecules have the same or substantially the same comonomer-to-ethylene ratio.

In one embodiment, the interpolymer has a flexural modulus greater than, or equal to 60,000 psi, preferably greater than, or equal to 63,000 psi and more preferably greater than, or equal to 65,000 psi.

In one embodiment, the interpolymer has a flexural modulus less than, or equal to 100,000 psi, preferably less than, or equal to 95,000 psi and more preferably less than, or equal to 90,000 psi.

In one embodiment, the interpolymer has a flexural modulus from 60,000 psi to 100,000 psi and preferably from 63,000 psi to 95,000 psi and more preferably from 65,000 psi to 90,000 psi.

The ethylene-based interpolymer may comprise a combination of two or more embodiments as described herein.

Catalysts

In a preferred embodiment, the ethylene-based interpolymer is polymerized using a chrome catalyst. The chrome catalyst is preferably a chromium oxide catalyst, and more preferably a fluoride modified chromium oxide catalyst. The chromium oxide catalysts may be CrO3 or any compound convertible to CrO3 under the activation conditions employed. Compounds convertible to CrO3 are disclosed in U.S. Pat. Nos. 2,825,721; 3,023,203; 3,622,251; and, 4,011,382 (each incorporated herein by reference), and include chromic acetyl acetone, chromic chloride, chromic nitrate, chromic acetate, chromic sulfate, ammonium chromate, ammonium dichromate, or other soluble, chromium containing salts. Chromium (III) acetate is a preferred chromium compound.

The chromium based catalysts of the current invention are deposited onto conventional catalyst supports or bases, for example, inorganic oxide materials. The inorganic oxide materials, which may be used as a support in the catalyst compositions, are porous materials having a high surface area, for example, in the range of 50 to 1000 square meters per gram, and a particle size of typically 20 to 200 micrometers. The inorganic oxides include silica, alumina, thoria, zirconia, aluminum phosphate and other comparable inorganic oxides, as well as mixtures of such oxides. Preferred supports are both granular and spray dried silica gels, particularly those with greater than 70% of their pore volume in pores with diameter greater than 100 Angstroms. The support must also have sufficient thermal stability, such that sintering of the surface will not occur at activation temperatures of 500° C. to as high as 1000° C. Particularly preferred silica gels are produced by Ineos/Philadelphia Quartz and WR Grace, and marketed under a variety of grade names. Among these are Davison Grade 948, 955 or 957 silica gels and Ineos EP 30×, 30×A, ES70, EP 352 and ES 370 silica gels.

Processes for depositing the chromium compound, oxidizable to Cr+6, on the support are known in the art, and may be found in the previously disclosed publications. The chromium compound is usually deposited on the support from solutions thereof, and in such quantities as to provide, after the activation step, the desired levels of chromium in the catalyst. After the compounds are placed on the supports and are activated, there results a powdery, free-flowing particulate material.

Activation of the supported chromium oxide catalyst can be accomplished at nearly any temperature up to its sintering temperature. The passage of a stream of dry air or oxygen through the supported catalyst during the activation, aids in the displacement of any water from the support, and converts, at least partially, the chrome species to Cr+6. Activation temperatures from 300° C. to 900° C., for periods from greater than one hour to as high as 48 hours, are acceptable. Well dried air or oxygen is used, and the temperature is maintained below the sintering temperature of the support.

Fluoride sources may also be added during the activation process. For example, either HF or compounds that degrade to HF and SiF4 are used. It is known that these compounds will act to partially sinter the surface of the support, particularly when a silica gel is used as the support. This fluoridation preferentially shrinks the smallest pores in the gel, resulting in narrower molecular weight and composition distribution in the resultant polymer. This is particularly important in linear low density polymer production.

Other compounds can be added to the chromium containing catalyst support. In particular, halide free titanium compounds are added to improve the molecular weight response of the catalyst to reaction conditions. Particularly preferred compounds are titanium esters that are hydrocarbon soluble, that is, Ti(OR)4, where R is a saturated hydrocarbon radical of 2 to 8 carbons. Particularly preferred are ethyl, isopropyl and butyl groups. The titanium compound may be added either directly to the fluidized bed catalyst activator, or, in a separate step, by mixing, in slurry, the chromium catalyst support and the titanium ester in a hydrocarbon solvent, followed by recovery of the reaction mixture from the solvent. When the latter method of titanium addition is used, the chromium catalyst support is preferably pre-dried to remove adsorbed water from the support. If a fluoride source will later be added, this latter method of titanium addition is highly preferred.

Chemistry of Catalyst Preparation—Chromium on Silica/Titanium Treatment and Fluoride Treatment Preferred catalysts are prepared by using commercially available silica, meeting the aforementioned requirements, to which chromium (III) acetate has been added as a chrome source. The silica/chromium substrate is then treated with a titanium ester. This treatment occurs on a chromium on silica, which has been pre-dried at about 150° C. to 200° C., to remove physically adsorbed water. The titanate is added as a solution to a slurry of the silica in isopentane solvent. The slurry is dried, and then activated, in air, at temperatures up to 1000° C. During activation, the titanium is converted to a surface oxide. The chromium (3) acetate also is converted to a Cr+6 oxide. When a fluoriding agent is used as a surface modifier, (NH4)2SiF6 is an especially preferred compound, due to ease of handling and thermal stability. Compounds such as this are a safe alternative to the highly hazardous HF that may also be used as a modifier for the catalyst. The compound (NH4)2SiF6 decomposes to yield HF, which reacts both with the silica surface and possibly the Cr and Ti compounds.

Activation

Activation proceeds through calcination of the titanated support, in an air atmosphere, at temperatures in excess of 800° C., in a fluidized bed. The system is generally maintained under nitrogen, until a temperature of 300° C. is reached, to eliminate most of the organics from the support prior to switching to air. The system is then heated under air, cooled under air, and finally put under nitrogen. Catalyst is then ready for use.

Catalyst Residues

A common methodology to determine the catalyst type is to determine the residual metals in polymers. Those polymers that are based on Cr catalysts will have metals that reveal if it was supported, like Si, for a silica support, and the catalyst metals as in this invention, simply Cr and Ti and F. Polymers which have other residual metals or other combinations or residual metals are from other catalyst systems. For example, it is commonly known that residual metals from Z—N catalyst systems have Ti, and Mg and Al, as well as silica support. Typical molar ratios in a Z—N system are Mg/Ti molar ratios from 1 to 10, and Al/Ti ratios from 5 to 100. When there is an absence of Cr, and the presence of these or other metals, and in these molar ratios, these polymers are not Cr catalyzed polymers. Sometimes it is required to analyze for residual Cr species in the less than 1 ppm range.

Polymerization

Various polymerization modes may be used to form the ethylene-based interpolymer. Preferably, gas phase polymerization is employed, with superatmospheric pressures in the range from 1 to 1000 psi (7 kPa-7 MPa), preferably from 50 to 500 psi (340 kPa-3.4 MPa), most preferably from 100 to 450 psi (700 kPa-3.1 MPa), and temperatures in the range of 30° C. to 130° C., preferably from 65° C. to 115° C. Stirred or fluidized bed, gas phase reaction systems are particularly useful. In the gas fluidized bed polymerization of olefins, the polymerization is conducted in a fluidized bed reactor, wherein a bed of polymer particles is maintained, in a fluidized state, by means of an ascending gas stream, comprising the gaseous reaction monomer.

The polymerization of olefins in a stirred bed reactor differs from polymerization in a gas fluidized bed reactor, by the action of a mechanical stirrer within the reaction zone, which contributes to fluidization of the bed. The start-up of such a polymerization process generally employs a bed of pre-formed polymer particles similar to the polymer, which it is desired to manufacture. During the course of polymerization, fresh polymer is generated by the catalytic polymerization of the monomer, and polymer product is withdrawn to maintain the bed at more or less constant volume. An industrially favored process employs a fluidization grid to distribute the fluidizing gas to the bed, and also to act as a support for the bed when the supply of gas is cut off. A stream containing unreacted monomer is withdrawn from the reactor continuously, compressed, cooled, optionally fully or partially condensed as disclosed in U.S. Pat. Nos. 4,528,790 and 5,462,999 (each incorporated herein by reference), and recycled to the reactor. Product is withdrawn from the reactor, and make-up monomer is added to the recycle stream. As desired for temperature control of the system, any gas, inert to the catalyst composition and reactants, may also be present in the gas stream. In addition, a fluidization aid, such as carbon black, silica, clay, or talc, may be used, as disclosed in U.S. Pat. No. 4,994,534 (incorporated herein by reference). Polymerization may be carried out in a single reactor or in two or more reactors in series, and preferably is carried out in a single reactor.

A gas phase polymerization reaction system, substantially as described in U.S. Pat. Nos. 4,376,191 and 5,317,036 (each incorporated herein by reference), is used to prepare the ethylene/1-hexene copolymers. The reactor utilized, was a nominal "14 inch diameter" gas phase, fluidized bed reactor, with a 10 foot straight side and a cone and expanded section for disengagement of fines. Bed level was generally run at approximately 8 to 9 feet in height, giving a roughly 8 ft3 bed volume. The reactor was run at production rates sufficiently high to mimic the residence time observed in commercial reactors (roughly 2 to 2½ hours). A small amount of triethylaluminum is fed, preferably continuously, to the reactor, to prevent sheeting and chunking. The triethylaluminum compound is preferably fed, as a solution in isopentane, directly into the fluidized bed. The feed rate of this compound was controlled, such that the weight ratio of TEAL feed to ethylene feed was maintained at greater than 0.1 and less than 1 ppm.

Catalyst feed is as a dry powder, conveyed into the reactor using a nitrogen carrier. The catalyst is metered into the reactor by falling into holes in a rotating disc, that then passes over a "pickup block" (catalyst drops through into a conveying nitrogen stream), and into the reactor. Hence, a "shot" is one hole in the feeder or "shots/minute." Alternative methods of catalyst feed, such as those described in U.S. Pat. No. 7,202,313 (incorporated herein by reference) may also be used.

Oxygen may also be fed to the reactor as a means to control polymer molecular weight, for example, increased amounts of oxygen introduced into the reactor will decrease polymer molecular weight. Oxygen feed is typically maintained between zero and greater than 500 ppb (molar), based on ethylene feed to the reactor. Gas compositions are measured using online gas chromatography.

Additives

A composition may contain one or more additives. Suitable additional components include, but are not limited to, fillers, processing aids, acid neutralizers, UV stabilizers, antioxidants, process stabilizers, metal de-activators, lubricants, anti-blocking agents, antistatic agents, antimicrobial agents, chemical blowing agents, coupling agents, nucleating agents, additives to improve oxidative or chlorine resistance, pigments or colorants, and combinations thereof. A typical additive package choice may contain a mixture of phenolic and phosphite type antioxidants.

Fabricated Articles

The interpolymers and compositions of the present invention can be used to manufacture a shaped article, or one or more components of a shaped article. Such articles may be single-layer or a multi-layer articles, which are typically obtained by suitable known conversion techniques, applying heat, pressure, or a combination thereof, to obtain the desired article. Suitable conversion techniques include, for example, blow-molding, co-extrusion blow-molding, injection molding, injection stretch blow molding, compression molding, extrusion, pultrusion, calendering and thermoforming. Shaped articles provided by the invention include, for example, films, geomembranes, blow molded articles, injection molded articles, compression molded articles, drip tapes, coatings, fibers, pipes, tubing, profiles and moldings.

The compositions of the invention can be used to form geomembranes, which are essentially impermeable synthetic sheets used for the containment of liquids, gases and/or solids. Geomembranes are used to convey water, hold water, cover water, and protect water by containing hazardous materials. Geomembranes are also used as a hydraulic barrier in purification processes, and as a gas barrier. In particular, geomembranes are used to contain water for agricultural use, and/or to keep pollutants out of a clean water supply. A geomembrane may be prepared by sealing, via heat or other means, films or sheets (for example, formed from compositions containing olefin-based polymers), along one or more overlapping seams, to create a long, wide sheet with fused overlaps. A geomembrane may also be formed from sheets of polymer that are welded together on the site of end use, such as on a piece a farm land. Geomembranes maybe used to cover landfills to keep out pollutants. Films and sheets, either smooth or textured, may contain multiple layers of coextruded polymer compositions. Olefin-based polymers may be coextruded with polar polymers, such as polyamides, ethylene vinyl alcohols and polyesters. An inventive geomembrane may be combined with other films, sheets, wovens, or nonwovens via lamination and/or coextrusion processes.

Tubing

Examples of hollow tubes include, but are not limited to, flexible tubing, pipes, hoses, inner tubes, drip tubing, and micro irrigation tubing. The invention is particularly suitable for the preparation of pressure tubes, such as irrigation tubes, and especially drip irrigation tubes and micro irrigation tubes. Hollow tubes may come in various shapes and sizes, are typically used as a means to hold and/or convey and/or release fluids and/or gases.

Micro irrigation tubing and drip tubing are used to conserve water in greenhouses, landscaping, other turf applications, or in robust row crops, such as nut trees or even vineyards. The tubing is a main piece of equipment which is used mostly for the 'laterals' within the distribution systems. The tubing also called 'thick-walled hose' is typically black LLDPE, at 35-40 mils in thickness, but can vary based on the customer requirements. The tubing diameter typically ranges from ¼ inches up to ⅝ inches, but possibly smaller or larger depending on the irrigation schedule.

DEFINITIONS

The term "polymer" is used herein to indicate, for example, a homopolymer, a copolymer, or a terpolymer. The term "polymer," as used herein, also includes interpolymers, such as those made by the copolymerization of ethylene with an α-olefin.

The term "interpolymer," as used herein, refers to a polymers prepared by the polymerization of at least two different types of monomers. The generic term interpolymer thus includes copolymers (employed to refer to polymers prepared from two different types of monomers), and polymers prepared from more than two different types of monomers.

The term "ethylene-based interpolymer," as used herein, refers to an interpolymer that contains at least a majority weight percent polymerized ethylene (based on the weight of interpolymer), and one or more additional comonomers.

The term "ethylene/α-olefin interpolymer," as used herein, refers to an interpolymer that contains at least a majority weight percent polymerized ethylene (based on the weight of interpolymer), an α-olefin, and optionally, one or more additional comonomers.

The term "ethylene/α-olefin copolymer," as used herein, refers to a copolymer that contains at least a majority weight percent polymerized ethylene (based on the weight of copolymer), and an α-olefin as the only two monomer types.

The term "in-situ reaction blending," as used herein, refers to the blending of two or more polymers by polymerizing at least one polymer in the presence of at least one other polymer.

The term "post-reactor blending," as used herein, refers to the blending of two or more polymers, each polymerized in a separate reactor.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Plaque Preparation

Plaques were made in accordance with ASTM D-4703-00 Annexes A1-A7, and procedure C for the appropriate type of resin, based on its density according to Annex section A1.5.6.3.

Density

Density was measured via ASTM D-792-98 test method B. The plaques were made in accordance with ASTM D-4703-00 Annexes A1-A7 and procedure C.

Melt Index

ASTM-1238-04 was used to measure the MI2 (2.16 kg), MI10 (10.0 kg), MI21 (21.6 kg) melt indices at 190° C.

Flexural Properties

ASTM D790-03 Procedure B was used to measure the flexural modulus of the resin, at a "0.05-inch per minute rate." The compression molded plaque specimens were made per ASTM D-4703-00 as described above.

Sheets

The inventive resin can be extruded into sheets using standard cast and blown sheet fabrication methods. As with any extrusion method, resin is introduced, as solid pellets, into the feed end of an extruder. Resin is then subsequently melted, compressed, and ultimately metered in a screw, and then fed, as a molten polymer, through the die head. Various temperature profiles can be employed in order to facilitate this process.

The inventive resins can be extruded into cast and blown sheets on pilot scale fabrication lines, at typical extrusion temperatures used in the industry. Typical screw diameters are from 2.5 to 3.5 inches for blown sheet, and from 1 to 2.5 inches for cast sheet. Typical "screw length" to "screw diameter" ratios are from 24:1 to 30:1. A suitable die gap is selected to provide a sheet thickness of 40 mils or more.

DSC analysis for the inventive resins show that the melting points (Tm) range from around 121-122° C. This is within the expected, Tm range for a LLDPE. In addition, all inventive resins had sufficient melt strength for both pilot cast and blown sheet lines. There are two main commercial extrusion manufacturing methods for sheets: round-die (blown film) and cast extrusion. The output rate for a commercial line is typically greater than 700 lbs/hr, and a typical sheet thickness ranges from 10 mils to 200 mils.

An example of a round-die extrusion includes a Battenfeld Gloucester commercial line extruder package, where the screw diameter ranges, for example, from 4 to 10 inches, and the "screw length" to "screw diameter," or L/D, could be 24/1, 36:1, or 30:1. The die is typically a round, non-rotating head ranging from 6 feet to 15 feet in diameter, with a lay flat up to 23-ft. The equipment would also include an air ring, bubble cage, primary nip roller and winder.

A cast line extrusion, such as a Killion, would include a flat die head (as opposed to a round head), flat sheet extrusion up to 23-ft in width, chill rollers downstream of the die, and no air ring. Similar screw dimensions, as discussed above, would be used.

Tensile Properties on Sheets

ASTM D-6693 was used to analyze the tensile properties on sheets. Each sheet was tested at 23° C. and 50% RH, without any further conditioning. The required pull rate per ASTM D-6693 was two inches per minute.

Tensile Properties on Molded Plaques

ASTM D-638-03 was used to analyze the tensile properties on molded plaques. The molded plaques were cut into Type IV "dog bone shaped" bars according to ASTM D-638-03. The required pull rate was two inches per minute (2-ipm). The plaques were prepared in accordance with ASTM D-4703-00 annexes A1-A7 and procedure C.

Sheet Thickness

ASTM D-5199 was used to measure the sheet thickness.

Sheet Puncture Performance

ASTM D-4833 was used to measure the sheet puncture performance.

Sheet Tear Performance

ASTM D-1004 was used to measure the MD (machine direction) and CD (cross direction) or TD (transverse direction) tear performance of the sheet.

Percent Carbon Black

ASTM D-1603 modified was used to measure the percent carbon black in the samples. The test was modified to include a muffle furnace per ASTM D-4218.

Differential Scanning Calorimetry (DSC)—DSC Calibration and Sample Analysis

Baseline calibration of the DSC Q1000 (TA Instruments) was performed by using the calibration wizard in the software provided for this instrument. First, a baseline was obtained by heating the cell from −80° C. to 280° C., without any sample in the aluminum DSC pan. After that, sapphire standards were used according to the instructions in the wizard. Then about 1-2 mg of a fresh indium sample was analyzed by heating the sample to 180° C., cooling the sample to 120° C., at a cooling rate of 10° C./min, followed by maintaining the sample isothermally at 120° C. for one minute, followed by heating the sample from 120° C. to 180° C. at a heating rate of 10° C./min. The heat of fusion and the onset of melting of the indium sample were determined, and checked to be within "0.5° C." from "156.6° C." for the onset of melting, and within "0.5 J/g" from "28.71 J/g" for the heat of fusion. Then deionized water was analyzed by cooling a small drop of deionized water in the DSC pan from 25° C. to −30° C., at a cooling rate of 10° C./min. The sample was kept isothermally at −30° C. for two minutes, and heated to 30° C. at a heating rate of 10° C./min. The onset of melting was determined and checked to be within "0.5° C." from "0° C."

Samples of polymer (pellets) were pressed into a thin film, at a temperature of 350° F. (about 1500 psi for 10 seconds, ambient atmosphere), and the allowed to cool to room temperature. About 5 to 8 mg of film was weighed and placed in a DSC pan. A lid was crimped on the pan to ensure a closed atmosphere. The sample pan was placed in the DSC cell, and then heated at a high rate of about 100° C./min, to a temperature of about 30° C. above the polymer melt temperature. The sample was kept at this temperature for about three minutes. Then the sample was cooled at a rate of 10° C./min to −40° C., and kept isothermally at that temperature for three minutes (first cooling). Consequently the sample was heated at a rate of 10° C./min, until melting was complete (second heating). The resulting enthalpy curves were analyzed. The crystallization point, and melting point, and their respective heats of fusion, were determined from the first cooling profile and the second heating profile, respectively.

Gel Permeation Chromatography (GPC)

Polymer molecular weight was characterized by high temperature, triple detector gel permeation chromatography (3D-GPC). The chromatographic system consisted of a Waters (Milford, Mass.), 150° C. high temperature chromatograph, equipped with a Precision Detectors (Amherst, Mass.) 2-angle laser light scattering detector, Model 2040, and a 4-capillary differential viscometer detector, Model 150R, from Viscotek (Houston, Tex.). The "15° angle" of the light scattering detector was used for calculation purposes. Concentration was measured via an infra-red detector (IR4) from PolymerChar (Valencia, Spain).

Data collection was performed using Viscotek TriSEC software version 3 and a 4-channel Viscotek Data Manager DM400. The carrier solvent was 1,2,4-trichloro-benzene (TCB). The system was equipped with an on-line solvent degas device from Polymer Laboratories. The carousel compartment and the column compartment were operated at 150° C. The columns were four "Polymer Laboratories Mixed-A 30 cm, 20 micron" columns. The polymer solutions of the reference and inventive samples were prepared in TCB. The sample solutions were prepared at a concentration of "0.1 gram of polymer in 50 ml of solvent." The chromatographic solvent (TCB) and the sample preparation solvent (TCB) contained 200 ppm of butylated hydroxytoluene (BHT). Both solvent sources were nitrogen sparged. The polyethylene samples were stirred gently at 160° C. for four hours. The injection volume was 200 µl, and the flow rate was 1.0 ml/minute.

The preferred column set is of "20 micron particle size" and "mixed" porosity gel to adequately separate the highest molecular weight fractions appropriate to the claims. Calibration of the GPC column set was performed with 21 narrow molecular weight distribution polystyrene standards. The molecular weights of the standards ranged from 580 to 8,400,000 g/mol, and were arranged in six "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B \quad (1),$$

where M is the molecular weight, A has a cited value of 0.4316, and B is equal to 1.0.

In place of the cited "A" value, a "q" (or a "q factor") was used, and this "q" value was experimentally determined to be around 0.39 (Equation 1 above). The best estimate of "q" was determined using the predetermined weight average molecular weight of a broad linear polyethylene homopolymer (Mw~115,000 g/mol, Mw/Mn~3.0). Said weight average molecular weight was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Page 113-136, Oxford, N.Y. (1987)). The response factor, $K_{LS}$, of the laser detector was determined using the certificated value for the weight average molecular weight of NIST 1475 (52,000 g/mol). The method for obtaining the "q factor" is described in more detail below.

A first order polynomial was used to fit the respective polyethylene-equivalent calibration points obtained from Equation 1 to their observed elution volumes. The actual polynomial fit was obtained, so as to relate the logarithm of polyethylene equivalent molecular weights to the observed elution volumes (and associated powers) for each polystyrene standard.

The total plate count of the GPC column set was performed with EICOSANE (prepared at 0.04 g in 50 milliliters of TCB, and dissolved for 20 minutes with gentle agitation). The plate count and symmetry were measured on a 200 microliter injection according to the following equations:

$$\text{PlateCount} = 5.54 * (RV \text{ at Peak Maximum}/(\text{Peak width at } \tfrac{1}{2} \text{ height}))^2 \quad (2),$$

where RV is the retention volume in milliliters, and the peak width is in milliliters.

$$\text{Symmetry} = (\text{Rear peak width at one tenth height} - RV \text{ at Peak maximum})/(RV \text{ at Peak Maximum} - \text{Front peak width at one tenth height}) \quad (3),$$

where RV is the retention volume in milliliters, and the peak width is in milliliters.

The plate count for the chromatographic system (based on EICOSANE as discussed previously) should be greater than 22,000, and symmetry should be between 1.00 and 1.12.

The Systematic Approach for the determination of each detector offset was implemented in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)), using data obtained from the three detectors, while analyzing the broad linear polyethylene homopolymer (115,000 g/mol) and the narrow polystyrene standards. The Systematic Approach was used to optimize each detector offset to give molecular weight results as close as possible to those observed using the conventional GPC method. The overall injected concentration, used for the determinations of the molecular weight and intrinsic viscosity, was obtained from the sample infra-red area, and the infra-red detector calibration (or mass constant) from the linear polyethylene homopolymer of 115,000 g/mol. The chromatographic concentrations were assumed low enough to eliminate addressing 2nd Virial coefficient effects (concentration effects on molecular weight).

The calculations of Mn, Mw, Mz and Mz+1 based on GPC results using the IR4 detector and the narrow standards calibration were determined from the following equations:

$$\overline{Mn} = \frac{\sum\limits_{i} IR_i}{\sum\limits_{i} (IR_i / M_{PE,i})}, \quad (4)$$

$$\overline{Mw} = \frac{\sum\limits_{i} (IR_i * M_{PE,i})}{\sum\limits_{i} IR_i}, \quad (5)$$

$$\overline{Mz} = \frac{\sum\limits_{i} (IR_i * M_{PE,i}^2)}{\sum\limits_{i} (IR_i * M_{PE,i})}, \quad (6)$$

$$\overline{Mz+1} = \frac{\sum\limits_{i} (IR_i * M_{PE,i}^3)}{\sum\limits_{i} (IR_i * M_{PE,i}^2)}. \quad (7)$$

Where $IR_i$ and $M_{PE,i}$ are the IR baseline corrected response and conventional calibrated polyethylene molecular weight for the ith slice of the IR response, elution volume paired data set. The Equations 4, 5, 6, and 7 are calculated from polymers prepared in solutions of TCB.

The "q-factor," described previously, was obtained by adjusting "q" or A in Equation 1, until Mw, the weight average molecular weight calculated using Equation 5, and the corresponding retention volume polynomial, agreed with the independently determined value of Mw, obtained in accordance with Zimm for the broad linear polyethylene homopolymer (115,000 g/mol).

The weight percent of polymer fraction with molecular weights $>10^6$ g/mol, was calculated by summing the baseline corrected IR responses, $IR_i$, for the elution volume slices, whose calibrated molecular weights, $M_{PE,i}$, were greater than $10^6$ g/mole, and expressing this partial sum as a fraction of the sum of all the baseline corrected IR responses from all elution volume slices. A similar method was used to calculate the weight percentage of polymer fractions with absolute molecular weights $>10^6$ and $10^7$ g/mol. The absolute molecular weight was calculated use the 15° laser light scattering signal and the IR concentration detector, $M_{PE,i,\,abs}$=KLS* $(LS_i)/(IR_i)$, using the same KLS calibration constant as in Equation 8. The paired data set of the ith slice of the IR response and LS response was adjusted using the determined off-set as discussed in the Systematic Approach.

In addition to the above calculations, a set of alternative Mw, Mz and Mz+1 [Mn(abs), Mw(abs), Mz(abs), and Mz+1 (abs)] values were also calculated with the method proposed by Yau and Gillespie, (Yau and Gillespie, Polymer, 42, 8947-8958 (2001)), and determined from the following equations:

$$\overline{Mn}(\text{abs}) = K_{LS} * \frac{\sum_{i}(IR_i)}{\sum(IR_i/LS_i)}, \quad (8)$$

$$\overline{Mw}(\text{abs}) = K_{LS} * \frac{\sum_{i}(LS_i)}{\sum(IR_i)}, \quad (9)$$

where, KLS=LS–MW calibration constant. As explained before, the response factor, KLS, of the laser detector was determined using the certificated value for the weight average molecular weight of NIST 1475 (52,000 g/mol).

$$\overline{Mz}(\text{abs}) = K_{LS} * \frac{\sum_{i}[IR_i * (LS_i/IR_i)^2]}{\sum[IR_i * (LS_i/IR_i)]}, \quad (10)$$

and $$\overline{Mz+1}(\text{abs}) = K_{LS} * \frac{\sum_{i}[IR_i * (LS_i/IR_i)^3]}{\sum[IR_i * (LS_i/IR_i)^2]}, \quad (11)$$

where $LS_i$ is the 15 degree LS signal and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker was therefore established based on a decane flow marker dissolved in the eluting sample prepared in TCB. This flow rate marker was used to linearly correct the flow rate for all samples by alignment of the decane peaks.

Dynamic Mechanical Spectroscopy (DMS)

Resins were compression-molded into "3 mm thick×25 mm diameter" circular plaques at 350° F. for 5 minutes under 1500 psi pressure in air. The sample was then taken out of the press and placed on a counter to cool.

Melt rheology, constant temperature frequency sweeps, were performed using a TA Instruments "Advanced Rheometric Expansion System (ARES)," equipped with "25 mm thick" parallel circular plates, under a nitrogen purge. The sample was placed on the plate, and allowed to melt for five minutes at 190° C. The plates were then closed to "2 mm gap," and the diameter of the sample was trimmed to be roughly flushed with the diameter of the plates, and then the test was started. The method has an additional five minute delay built in, to allow for temperature equilibrium. The experiments were performed at 190° C. over a frequency range of 0.01 to 100 rad/s. The strain amplitude was constant at 10%. The stress response was analyzed in terms of amplitude and phase, from which the storage modulus (G'), loss modulus (G"), dynamic viscosity η*, and tan(δ) were calculated.

Melt Strength

Melt strength was determined using a Göttfert Rheotens 71.97 (stand alone unit which received the melt from the rheometer located upstream from this unit). Sample (typically pellets, and about 20-25 grams) was added to a rheometer (Göttfert Rheotester 2000) which melted the sample (190° C.) and transferred the melt to the Göttfert Rheotens 71.97, as discussed above. The rheometer was operated at 190° C., unless otherwise specified, and equipped with a 12 mm barrel, and a die with flat entrance (L=30 mm and ID=2 mm), and a piston at a speed of 0.265 mm/s. The Göttfert Rheotens 71.97 had an air gap—distance from the die exit to the take-up wheels—which was set to 100 mm, and the wheels' acceleration was 2.4 mm/s².

The Rheotens melt strength values, reported in centi-Newtons (cN), correspond to the force experienced by the wheels at the maximum velocity, that is, right before rupture of the sample.

Analytical Temperature Rising Elution Fractionation (ATREF)

The granular form of the comparative samples (C4 V1-9) and inventive samples (C6 XGMB A, C-E), and the pelleted form of the competitive samples (MARLEX resins), were each characterized by ATREF. The inventive samples and the comparative samples were measured without the typical additives, in typical amounts, to satisfy the stabilization requirements of the geomembrane application, whereas the competitive resins had the typical amounts of antioxidants. The typically quantities of additives in the competitive resins will not affect the respective ATREF profiles. The pelleted form of the comparative sample (NT resin) and inventive sample (0.3 LLDPE resin) were each characterized by ATREF. The ATREF refers to "Analytical Temperature Rising Elution Fractionation," as described, for example, in Hazlitt, *J. Appl. Polym. Sci.: Appl. Poly. Symp.*, 45, 25-37 (1990), fully incorporated herein by reference. See also, Wild et al., Journal of Polymer Science, Poly. Phys. Ed., Vol. 20, p. 441 (1982), fully incorporated herein by reference. See also U.S. Pat. No. 4,798,081 (Hazlitt et al.) and U.S. Pat. No. 5,089,321 (Chum et al.), each fully incorporated herein by reference.

The heating rate was 1° C./min. An IR detector from PolymerChar (Spain) was used as concentration detector. The oven temperature was calibrated by using NIST linear polyethylene 1475a. The NIST linear polyethylene 1475a is calibrated to have ATREF peak temperature at 102.0° C.

A process control gas chromatographic (GC) analyzer was used as the basis of the design, and functioned as a computer controlled event sequencer and multiple GC oven programmer. The GC analyzer's primary components included two large, forced-air, isothermal (135° C.) ovens, and four smaller, programmable, forced-air GC ovens. A "5-mL" sample loop consisting of 1/16" large ID stainless steel tubing, was used to temporarily receive the freshly injected polymer solution. A syringe-pump assembly (a 5-mL syringe barrel and an air cyclinder to drive the plunger) provided the necessary vacuum to move the polymer solution into the sample loop. The polymer solutions were introduced to the system via a sample carousel assembly. In each programmable GC oven was a small ATREF column constructed of 1/8" thin-walled, stainless-steel tubing, packed with stainless-steel shot (for example, 0.023"×0.023" stainless-steel shot from Pellets Inc.). The total interstitial volume of the column was 1.5 mL. An LC pump was used to move the solvent, 1,2,4-trichlorobenzene (TCB) through the system. The polymer was dissolved in TCB at about 0.1 to 0.4% by weight; the concentration is adjusted to accommodate the sharpness and intensity of the eluting peaks. The polymer solutions were placed into 15 mL vials with open-holed caps fitted with TEFLON septa, and then placed on the carousel. The polymer solution (5 mL) was injected into the column (excess solution was flushed out of the system), and the polymer was crystallized on steel shot within the ATREF column (for example, reduce the column temperature from 122° C. to 106° C. at −10 C/min, then from 106° C. to 20° C. at −0.1° C./min). Fresh solvent was then injected into the column, as the temperature was raised from 20° C. to 120° C., at a rate of 1° C./minute. After exiting the column, the solvent was run through the IR detector for mass determination. See Hazlitt, *J. Appl. Polym. Sci.: Appl. Poly. Symp.*, 45, 25-37 (1990), fully incorporated herein by reference.

The ATREF curve is also frequently called the short chain branching distribution (SCBD) curve, since it indicates how the comonomer (for example, 1-hexene) is distributed throughout the sample, in that, as the elution temperature decreases, comonomer content increases. The IR detector provides concentration of polymer as a function of temperature, which can be used to generate the short chain branching distribution curve. The generated curve that shows data obtained from the IR detector, is known as, an ATREF overlay profile.

The ATREF profile exhibits three distinct features: a purge fraction, a SCBD fraction and a high density (HD) fraction. The purge fraction typically elutes at a temperature (at which maximum peak intensity is observed) of 35° C. or less, the HD fraction elutes at a temperature range greater than the elution temperature range of the SCBD fraction, and the SCBD fraction elutes at a temperature range between the other two fractions.

Calculation of the SCBD Fraction:

As discussed, the ATREF SCBD curve has three fractions: a high density fraction, a purge fraction and a SCBD fraction. The ATREF report provides the calculated values for the high density fraction % and the purge fraction %. The SCBD fraction percent (SCBDf %) is calculated as "100% minus the sum of the HD fraction % (HDf %) and the purge fraction % (Purgef %)." See Equation (i) below.

$$SCBDf\% = 100 - (HDf\% + Purgef\%) \quad (i)$$

For example, for comparative example "C4 V1," the purge fraction is 20.6% (based on the total peak area of the ATREF profile), and the high density fraction is 4.1% (based on the total peak area of the ATREF profile). From the equation (i) above the SCBDf %=100−(20.6+4.1)=75.3%. See L. G. Hazlitt, J. Appl. Polym. Sci.: Appl. Poly. Symp., 45, 25-37 (1990), incorporated herein by reference.

Another example of the calculation is as follows. For comparative example "NT Resin," the purge fraction is 17.5% (based on the total peak area of the ATREF profile), and the high density fraction is 8.9% (based on the total peak area of the ATREF profile). From the equation (i) above the SCBDf %=100−(8.9+17.5)=73.6%.

IR Structure

ASTM D-6264-98 was followed to determine vinyl and trans unsaturation per 1000 carbon.

ASTM D-2238-92 was followed to determine methyls per 1000 carbon.

ASTM D-3124-93 was followed to determine vinylidene unsaturation per 1000 carbon One-Inch DR 11 Pipe Extrusion The "one inch pipe" samples were produced on a Sterling Pipe extruder, which consists of a "2½ inch diameter," 24:1 L/D screw, vacuum box, cooling tank, pipe puller, cutter and winder. See Table 33 below for the extrusion conditions. The pipe was extruded to the specification per Table 3 (Wall Thickness and Tolerances for DR-PR PE Plastic Pipe) of ASTM D-3035-08, and the dimensions of the pipe were measured per ASTM D-2122-98.

One-Inch DR 11 Hydrostatic Pressure Testing

The time to failure by constant internal pressure of an extruded "one-inch DR 11 black pipe" sample was determined per ASTM D-1598-02, on an IPT Airless System (available from Airless System). This system consists of a water tank, at 23° C., containing the pipe specimens, a pump to circulate the water, and a separate system which maintains a constant water pressure at set-point inside each pipe specimen at each station. Micro controllers automatically adjust the individual pressures at each station. The system design automatically records the start time of the test, and then the end time when the pipe ruptures.

Hydrostatic Strength Regression Analysis

The "time to failure" data for each set of pipes was subject a regression analysis per ASTM D-2837-04 (Obtaining Hydrostatic Design Basis for Thermoplastic Pipe Materials or Pressure Design Basis for Thermoplastic Pipe Products). This ASTM procedure details the regression method used to determine the hydrostatic strength of a pipe. The method is based on "stress rupture data versus time," and is used to determine the resin's long-term mean hydrostatic strength (LTHS, measured per ASTM D 2837-04), at the required intercept of 100,000 hrs (11.4 yrs). This LTHS intercept is identified using a linear regression based the "log-stress versus the log-time."

The term 'stress' refers to the hoop stress, which is calculated using the internal pressure in the pipe, the wall thickness, and outside pipe diameter. The following equation describes the relationship between these parameters, $$S = P(D-t)/(2*t) \quad \text{(Eqn. ii)}$$

where:
S=hoop stress
P=internal pressure inside the pipe
D=average outside diameter
t=minimum wall thickness

EXPERIMENTAL

The following examples are to illustrate this invention and to not limit it. Ratios, parts, and percentages are by weight, unless otherwise stated.

Catalyst Preparation

The catalyst was prepared by the following multi-step procedure (see in EP 0640625A2, incorporated herein by reference).

Step 1: (Drying)—A chromium acetate containing silica (~0.2 weight percent Cr) having 70 percent of its pore volume, in pore size, greater than 100 Angstroms (Davison® 957 brand silica, available from Grace-Davison Corporation), was introduced into a fluid-bed drying vessel, maintained under nitrogen, at ambient temperature and pressure. The temperature of the vessel was increased to 150° C., at a rate of 50° C./hour. The silica was held at 150° C., for 4 hours, and then cooled to below 100° C., for 2 to 3 hours.

Step 2: (Titanation)—The product of Step 1 (190 kg) was charged to a jacketed mixing vessel. For each kg of the product of Step 1, "5.4 liters" of isopentane were added to the contents of the vessel, with stiffing, and increasing the jacket temperature to 55° C. After the temperature reached 55° C., 0.55 liters of "50 weight percent tetra-isopropyltitanate in hexane" were added for each kilogram of the product of Step 1. The vessel was pressurized from atmospheric to 4.1 atmospheres, and allowed to mix for two hours. The jacket temperature was increased to 90-100° C., and the pressure was reduced to 1.15 atmospheres, allowing the isopentane and hexane solvents to evaporate. Two hours after the pressure was released, the mixture was purged through the bottom of the vessel with 18 kg/hour of nitrogen for up to 24 hours.

Step 3. (Activation)—The product of Step 2 was placed in an activation vessel. Ammonium hexafluorosilicate was added (0.25 wt % based on the amount of titanated chromium containing silica), and, under good fluidization, the mixture was heated from ambient temperature to 150° C., at a rate of 50° C./hour, under nitrogen. It was then heated at 150° C. for two hours, followed by increasing the temperature from 150° C. to 325° C., at a rate of 50° C./hour in nitrogen. The product was maintained at 325° C. for two hours in nitrogen, and then one hour in air. The temperature was increased from 325° C. to 825° C., at a rate of 100° C./hr, in air, and maintained at 825° C. for four hours in air. The temperature was then decreased, as fast as possible (usually takes 3-5 hours) to 300° C. in air. At 300° C., the air was changed to nitrogen, and the temperature was decreased to ambient temperature as fast as possible (usually takes about 2 hours).

Inventive Polymers, Compositions and Sheets

The inventive polymers were polymerized in a gas phase reactor, in the presence of a fluorinated and titanated CrO catalyst, activated at 825° C., with the appropriate gas compositions (C6/C2 ratios and the like). The inventive samples employed the use of 1-hexene as the comonomer, and the comparative samples employed 1-butene as the comonomer. The granular polymer was removed from the reactor, cooled, and purged of residual hydrocarbons, such that no degradation occurred. The granular samples were then compounded, under mild compounding conditions, with the appropriate additives (primary and secondary types), taking all precautions to not incorporate any long chain branching in this step.

The inventive resins were then extruded into cast sheets using a pilot scale fabrication line. DSC analysis for the inventive resins show that the melting points (Tm) range from about 121° C. to 122° C. This is within the expected Tm range for a LLDPE. In addition, the inventive resins showed sufficient melt strength, required for extrusion.

Testing was conducted, per the test methods above, on either granular resin or pelleted resin with the appropriate additives, compression molded plaques, or extruded sheets. Sample properties are listed in Tables 4-26.

Representative Polymerizations

A gas phase fluidized bed reactor as described previously was used in the polymerizations. Reaction conditions and some resin properties are listed in Tables 1, 2 and 3.

TABLE 1

1-Hexene Inventive Samples

|  | C6 XGMB-A inventive | C6 XGMB-C inventive | C6 XGMB-D inventive | C6 XGMB-E inventive |
| --- | --- | --- | --- | --- |
| Cr wt % on Support | 0.2 | 0.2 | 0.2 | 0.2 |
| Reaction Conditions |  |  |  |  |
| Reactor Temp. ° C. | 88 | 87 | 88.4 | 86 |
| Inlet Temp | 81.3 | 79.1 | 80.3 | 77.3 |
| Pressure, psig | 348 | 348 | 348 | 348 |
| C2 Part. Pressure, psi | 249.7 | 249.4 | 249.6 | 249.3 |
| H2/C2 Molar Ratio | 0.05 | 0.05 | 0.0499 | 0.05 |
| C6/C2 Molar Ratio | 0.0295 | 0.038 | 0.0295 | 0.035 |
| Ethylene Feed pph | 62.564 | 64.311 | 65.433 | 65.857 |
| Nitrogen mol % | 26.549 | 26.239 | 26.413 | 26.567 |
| Isopentane mol % | 0.164 | 0.183 | 0.161 | 0.167 |
| O2/C2 | 0 | 40.143 | 0 | 54.984 |
| Production Rate, lb/hr | 35.714 | 41.758 | 42.117 | 45.066 |
| Bed Weight, lbs | 125.7 | 110.1 | 125.5 | 124 |
| FBD(lb/ft3) | 17.6 | 14.6 | 17.8 | 17.2 |
| Bed Height | 7.5 | 7.9 | 7.4 | 7.5 |
| Alkyl Feed cc/hr | 135.9 | 133.6 | 133.5 | 124.8 |
| alkyl type | 0.01% TEAL | 0.01% TEAL | 0.01% TEAL | 0.01% TEAL |
| Residence Time, hr | 3.52 | 2.64 | 2.98 | 2.75 |
| SGV (ft/sec) | 1.7 | 1.8 | 1.7 | 1.7 |
| Resin Properties |  |  |  |  |
| Chromium ppmw | 0.39 | 0.44 | 0.52 | 0.44 |
| Al ppm-Calculated | 0.13 | 0.11 | 0.11 | 0.09 |
| Al/Cr | 0.6246 | 0.4675 | 0.392 | 0.4018 |
| Catalyst Productivity, lb/lb | 5147 | 4583 | 3878 | 4551 |
| Bulk Density, lb/ft3 | 26.7 | 24.3 | 27.1 | 27.2 |

TABLE 1-continued

1-Hexene Inventive Samples

|  | C6 XGMB-A inventive | C6 XGMB-C inventive | C6 XGMB-D inventive | C6 XGMB-E inventive |
|---|---|---|---|---|
| APS, inches | 0.033 | 0.035 | 0.034 | 0.033 |
| Fines, Wt % LT 120 Mesh | 0.4 | 0.8 | 0.3 | 1.3 |
| ppm TEAL Feed | 0.55 | 0.46 | 0.45 | 0.4 |

TABLE 2

1-Butene Comparative Samples

|  | C4 V 1 Comp. | C4 V 2 Comp | C4 V 3 Comp | C4 V 4 Comp | C4 V 5 Comp | C4 V 6 Comp | C4 V 7 Comp | C4 V 8 Comp | C4 V 9 Comp |
|---|---|---|---|---|---|---|---|---|---|
| Cr wt % on Support | 0.2 | 0.2 | 0.2 | 0.2 | 0.2 | 0.2 | 0.2 | 0.2 | 0.2 |
| Reaction Conditions |  |  |  |  |  |  |  |  |  |
| Temp. °C. | 90.0 | 90.0 | 90.0 | 90.0 | 91.3 | 91.4 | 88.8 | 84.6 | 84.5 |
| Inlet Temp | 85.0 | 84.6 | 84.1 | 83.7 | 84.1 | 83.1 | 79.3 | 76.6 | 76.5 |
| Pressure, psig | 348 | 348 | 347 | 347 | 347 | 347 | 348 | 348 | 348 |
| C2 Part. Pressure, psi | 249.6 | 249.3 | 249.4 | 249.3 | 248.9 | 249.2 | 249.3 | 249.4 | 249.6 |
| H2/C2 Molar Ratio | 0.0510 | 0.0510 | 0.0510 | 0.0510 | 0.0512 | 0.0510 | 0.0509 | 0.0509 | 0.0511 |
| C4/C2 Molar Ratio | 0.0824 | 0.0811 | 0.0810 | 0.0811 | 0.0770 | 0.0758 | 0.0737 | 0.0816 | 0.0852 |
| Ethylene Feed pph | 52.115 | 51.676 | 53.678 | 54.669 | 57.340 | 57.766 | 64.193 | 59.023 | 57.907 |
| Nitrogen mol % | 22.914 | 23.323 | 23.044 | 22.846 | 23.559 | 23.567 | 23.278 | 22.122 | 22.293 |
| Isopentane mol % | 0.036 | 0.033 | 0.043 | 0.043 | 0.066 | 0.047 | 0.073 | 0.049 | 0.055 |
| O2/C2 | 19.609 | 23.351 | 81.808 | 49.514 | 23.346 | 19.500 | 18.757 | 19.068 | 11.717 |
| E.B. Production Rate, lb/hr | 29.307 | 31.249 | 32.240 | 33.779 | 37.783 | 42.793 | 47.416 | 41.967 | 42.335 |
| Bed Weight, lbs | 145.1 | 145.5 | 105.0 | 105.3 | 116.1 | 121.2 | 148.0 | 146.7 | 147.0 |
| FBD (lb/ft$^3$) | 13.1 | 13.9 | 11.1 | 11.5 | 12.1 | 13.3 | 17.6 | 17.7 | 17.9 |
| Bed Height | 11.6 | 10.9 | 10.0 | 9.6 | 10.1 | 9.6 | 8.8 | 8.7 | 8.6 |
| alkyl Feed | 100.0 | 100.0 | 100.0 | 100.0 | 105.0 | 99.0 | 110.0 | 100.0 | 100.0 |
| alkyl type | 0.01% TEAL | 0.01% TEAL | 0.01% TEAL | 0.01% TEAL | 0.01% TEAL | 0.01% TEAL | 0.01% TEAL | 0.01% TEAL | 0.01% TEAL |
| Residence Time, hr | 4.95 | 4.66 | 3.26 | 3.12 | 3.07 | 2.83 | 3.12 | 3.50 | 3.47 |
| SGV (ft/sec) | 1.5 | 1.5 | 1.6 | 1.6 | 1.6 | 1.6 | 1.6 | 1.6 | 1.6 |

TABLE 3

1-Butene Comparative Samples continued

| Sample Type | C4 V 1 Comp. | C4 V 2 Comp. | C4 V 3 Comp. | C4 V 4 Comp. | C4 V 5 Comp. | C4 V 6 Comp. | C4 V 7 Comp. | C4 V 8 Comp. | C4 V 9 Comp. |
|---|---|---|---|---|---|---|---|---|---|
|  |  |  |  | Resin Properties |  |  |  |  |  |
| Chromium ppmw | 0.29 | 0.25 | 0.53 | 0.45 | 0.32 | 0.36 | 0.22 | 0.22 | 0.27 |
| Al ppm | 0.12 | 0.11 | 0.10 | 0.10 | 0.09 | 0.08 | 0.08 | 0.08 | 0.08 |
| Al/Cr or Zn/Cr | 0.7505 | 0.8056 | 0.3725 | 0.4237 | 0.5584 | 0.4153 | 0.6733 | 0.6964 | 0.5484 |
| Productivity, lb/lb | 6898 | 7896 | 3766 | 4489 | 6301 | 5630 | 9102 | 9166 | 7282 |
| Bulk Density, lb/ft3 | 27.2 | 27.8 | 23.6 | 23.6 | 25.6 | 26.8 | 29.2 | 29.2 | 29.6 |
| APS, inches | 0.045 | 0.045 | 0.031 | 0.035 | 0.044 | 0.039 | 0.036 | 0.039 | 0.040 |
| Fines, Wt % LT 120 Mesh | 0.3 | 0.3 | 0.3 | 0.4 | 0.5 | 0.3 | 0.6 | 0.3 | 0.2 |
| ppm TEAL/C2 feed | 0.27 | 0.28 | 0.27 | 0.26 | 0.26 | 0.25 | 0.25 | 0.24 | 0.25 |

TABLE 4

Physical/Mechanical Properties Data

| Test/Method | Product | Industry Requirements | C6 XGMB - A Invent. | C6 XGMB - C Invent. | C6 XGMB - D Invent. | C6 XGMB - E Invent. |
|---|---|---|---|---|---|---|
| ASTM D-792 | Density (g/cm3) | 0.939 max | 0.926 | 0.924 | 0.921 | 0.919 |
| ASTM D-1238 | I2 g/10 min | | 0.29 | 0.36 | 0.31 | 0.25 |
| ASTM D-1238 | I2 Post Compounding g/10 min | | 0.3 | 0.340 | 0.320 | 0.272 |
| | I5 g/10 min | | 1.49 | 1.64 | 1.47 | 1.33 |
| | I10 g/10 min | | 5.30 | 6.33 | 6.00 | 5.13 |
| | I21 g/10 min | | 30.19 | 35.06 | 34.25 | 27.66 |
| | MFR (I10/I2) | | 18.2 | 17.4 | 19.3 | 20.7 |
| | MFR (I21/I2) | 100 | 104 | 97 | 110 | 111 |
| | MFR (I5/I2) | | 5.1 | 4.5 | 4.7 | 5.4 |
| | MFR (I21/I5) | | 20.3 | 21.3 | 23.3 | 20.8 |

TABLE 5

Rheological Properties & IR Structure

| Test/Method | | C6 XGMB - A inventive | C6 XGMB - C inventive | C6 XGMB - D inventive | C6 XGMB - E inventive |
|---|---|---|---|---|---|
| | Rheological | | | | |
| | Viscosity Ratio [10 − 2/10 + 2] (rad/rad) | 53 | 48 | 57 | 65 |
| | TanDelta Ratio [10 − 2/10 + 2] (rad/rad) | 3.02 | 3.15 | 2.99 | 2.86 |
| | IR structure | | | | |
| ASTM D6248-98 | Trans/1000 carbons | 0.165 | 0.174 | 0.199 | 0.167 |
| ASTM D6248-98 | Vinyls/1000 carbons | 0.883 | 0.928 | 0.914 | 0.834 |
| ASTM-2238-92 | Methyls/1000 carbons | 10.9 | 11.4 | 12.8 | 14.5 |

TABLE 6

DSC Data

| | C6 XGMB - A inventive | C6 XGMB - C inventive | C6 XGMB - D inventive | C6 XGMB - E inventive |
|---|---|---|---|---|
| Melting point (° C.) | 122.4 | 122.18 | 121.74 | 121.57 |
| Heat of fusion (J/g) | 155.9 | 156.8 | 149 | 144.8 |
| Crystallization point (° C.) | 111.9 | 111.95 | 111.4 | 111.3 |
| Heat of Crystallization (J/g) | 156.8 | 157.9 | 151.2 | 151.2 |

TABLE 7

ATREF & GPC Data

| | XGMB - C6 A inventive | XGMB - C6 C inventive | XGMB - C6 D inventive | XGMB - C6 E inventive |
|---|---|---|---|---|
| ATREF Results* | | | | |
| High Density Fraction (%) | 21.1 | 18.1 | 20.1 | 18.1 |
| Temp Min (° C.) | 92.6 | 93.5 | 94.4 | 92.4 |
| Purge (%) | 11.3 | 11.9 | 0.9 | 15.9 |
| SCB % (calculated) | 67.6 | 70 | 79 | 66 |

TABLE 7-continued

ATREF & GPC Data

| | XGMB - C6 A inventive | XGMB - C6 C inventive | XGMB - C6 D inventive | XGMB - C6 E inventive |
|---|---|---|---|---|
| Mv Ave | 75,435 | 80,408 | 92,958 | 70,902 |
| SCB MV | 73,712 | 80,311 | 93,801 | 76,054 |
| Purge Mv | 88,953 | 81,128 | 89 | 43,650 |
| GPC Data | | | | |
| Conventional GPC | | | | |
| Mn | 9,170 | 8,890 | 9,730 | 9,890 |
| Mw | 124,430 | 117,240 | 127,720 | 132,910 |
| Mz | 865,400 | 733,700 | 838,800 | 1,066,100 |
| Mw/Mn | 13.6 | 13.2 | 13.1 | 13.4 |
| Absolute GPC | | | | |
| Mn | 9,315 | 9,460 | 10,784 | 10,790 |
| Mw | 122,180 | 120,300 | 136,530 | 135,970 |
| Mw/Mn | 13.1 | 12.7 | 12.7 | 12.6 |
| Mz(BB) | 900,700 | 1,053,100 | 1,613,400 | 1,584,800 |
| Mz (abs) | 760,800 | 751,500 | 1,180,300 | 881,500 |
| Mz + 1 (BB) | 4,568,100 | 14,453,500 | 24,555,200 | 23,146,600 |
| Mz(abs)/Mw(abs) | 6.2 | 6.2 | 8.6 | 6.5 |
| Mz + 1(BB)/Mw (abs) | 37.4 | 120.1 | 179.9 | 170.2 |
| Comparable Mz/Mw | 1.0 | 1.0 | 1.0 | 0.9 |

*Graphical feature for each inventive sample: distinct bimodality in the SCBD curve, where HD peak height is greater than the SCBD peak height. HD peak > 92 C., <105 C.; SCBD peak > 80 C., <91 C.

TABLE 8

Tensile Molded Plaque Data

| Test/ Method | Product | Industry Requirements | C6 XGMB - A | C6 XGMB - C | C6 XGMB - D | C6 XGMB - E |
|---|---|---|---|---|---|---|
| | Type IV @ 2-ipm, 75-mil thick samples | Type IV, 2 - ipm, 75 mil thick samples | | | | |
| ASTM D638 | Stress @ Break (psi) | >3800 | 3911 | 4038 | 3789 | 3807 |
| | % Elongation @ Break | >800% | 780 | 829 | 803 | 797 |
| | Stress @ Yield (psi) | | 1975 | 1828 | 1662 | 1585 |
| | % Elongation @ yield | | 11.0 | 12.0 | 12.0 | 13.0 |
| | Secant Modulus 2% (psi) | | 42465 | 42494 | 34368 | 37007 |

TABLE 9

Sheet Tensile Data

| Test/ Method | Product | Industry Requirements | C6 XGMB- A Invent. | C6 XGMB - C Invent. | C6 XGMB- D Invent. | C6 XGMB - E Invent. |
|---|---|---|---|---|---|---|
| | Tensile (black) | Type IV, 2 ipm pull rate | | | | |
| ASTM D5199 | Thickness [mils] | | 63 | 61 | 68 | 66 |
| ASTM D1505 | Density [g/cc] | | 0.936 | 0.935 | 0.933 | 0.932 |
| ASTM D1603 | % Carbon Black | | 2.59 | 2 | 2.33 | 2.18 |
| ASTM D1238 | I2 @ 190 C./2.16 kg (g/10 min) | | 0.32 | 0.38 | 0.35 | 0.31 |
| ASTM D6693 | MD Stress @ Yield (ppi) | | 125 | 109 | 121 | 108 |
| | MD Stress @ Yield (PSI) | | 1984 | 1787 | 1779 | 1636 |
| | TD Stress @ Yield (ppi) | | 117 | 118 | 115 | 108 |
| | TD Stress @ Yield (PSI) | | 1857 | 1934 | 1691 | 1636 |
| | MD Stress @ Break (ppi) | | 293 | 286 | 316 | 300 |

TABLE 9-continued

Sheet Tensile Data

| Test/ Method | Product | Industry Requirements | C6 XGMB-A Invent. | C6 XGMB-C Invent. | C6 XGMB-D Invent. | C6 XGMB-E Invent. |
|---|---|---|---|---|---|---|
| | MD Stress @ Break (PSI) | >3800 | 4651 | 4689 | 4647 | 4545 |
| | TD Stress @ Break (ppi) | | 313 | 293 | 300 | 290 |
| | TD Stress @ Break (PSI) | >3800 | 4968 | 4803 | 4412 | 4394 |
| | MD % Elongation @ Yield | | 24 | 20 | 22 | 23 |
| | TD % Elongation @ Yield | | 21 | 19 | 20 | 19 |
| | MD % Elongation @ Break | >800% | 942 | 966 | 1049 | 1082 |
| | TD % Elongation @ Break | >800% | 994 | 971 | 992 | 994 |

TABLE 10

Black Sheet Puncture & Tear Data

| Test/ Method | | Industry Requirements | C6 XGMB-A inventive | C6 XGMB-C inventive | C6 XGMB-D inventive | C6 XGMB-E inventive |
|---|---|---|---|---|---|---|
| ASTM D4833 | Puncture Resistance [lbs] | 84 lbf @60 mils | 115 | 125 | 113 | 110 |
| ASTM D1004 | MD Tear Strength [lbs] | 33 lbf @60 mils | 44 | 47 | 44 | 44 |
| ASTM D1004 | TD Tear Strength [lbs] | 33 lbf @60 mils | 45 | 45 | 45 | 43 |

TABLE 11

Natural Sheet Tensile Data

| Test/ Method | Product | Industry Requir. | C6 XGMB-A inventive | C6 XGMB-C inventive | C6 XGMB-D inventive | C6 XGMB-E inventive |
|---|---|---|---|---|---|---|
| | Tensile (natural) | Type IV, 2 ipm pull rate | | | | |
| ASTM D5199 | Thickness [mils] | | 64 | 65 | 67 | 66 |
| ASTM D1505 | Density [g/cc] | | 0.925 | 0.925 | 0.922 | 0.921 |
| ASTM D1603 | % Carbon Black | | 0.01 | 0.01 | 0.01 | 0.01 |
| ASTM D1238 | I2 @ 190 C./2.16 kg | | 0.35 | 0.41 | 0.39 | 0.32 |
| ASTM D6693 | MD Stress @ Yield (ppi) | | 117 | 123 | 122 | 108 |
| | MD Stress @ Yield (PSI) | | 1828 | 1892 | 1821 | 1636 |
| | TD Stress @ Yield (ppi) | | 124 | 125 | 120 | 113 |
| | TD Stress @ Yield (PSI) | | 1938 | 1923 | 1791 | 1712 |
| | MD Stress @ Break (ppi) | | 276 | 277 | 285 | 294 |
| | MD Stress @ Break (PSI) | >3800 | 4313 | 4262 | 4254 | 4455 |
| | TD Stress @ Break (ppi) | | 289 | 287 | 303 | 290 |
| | TD Stress @ Break (PSI) | >3800 | 4516 | 4415 | 4522 | 4394 |
| | MD % Elongation @ Yield | | 21 | 23 | 23 | 23 |
| | TD % Elongation @ Yield | | 19 | 20 | 22 | 22 |
| | MD % Elongation @ Break | | 881 | 894 | 925 | 1041 |
| | TD % Elongation @ Break | | 901 | 945 | 979 | 1025 |

TABLE 12

Natural Sheet Puncture & Tear Data

| Test/ Method | Product | Industry Requirements | C6 XGMB-A | C6 XGMB-C | C6 XGMB-D | C6 XGMB-E |
|---|---|---|---|---|---|---|
| ASTM D4833 | Puncture Resistance [lbs] | 84 lb @60 mils | 123 | 117 | 111 | 105 |

TABLE 12-continued

Natural Sheet Puncture & Tear Data

| Test/Method | Product | Industry Requirements | C6 XGMB-A | C6 XGMB-C | C6 XGMB-D | C6 XGMB-E |
|---|---|---|---|---|---|---|
| ASTM D1004 | MD Tear Strength [lbs] | 33 lbf @60 mils | 44 | 45 | 43 | 44 |
| | TD Tear Strength [lbs] | 33 lbf@60 mils | 46 | 45 | 45 | 43 |

TABLE 13

Comparative Samples Physical Properties

| Test | | Industry Require. | C4 V 1 | C4 V 2 | C4 V 3 | C4 V 4 | C4 V 5 | C4 V 6 | C4 V 7 | C4 V 8 | C4 V 9 |
|---|---|---|---|---|---|---|---|---|---|---|---|
| ASTM D-792 | Density (g/10 min) | 0.939 max | 0.920 | 0.919 | 0.920 | 0.919 | 0.919 | 0.919 | 0.922 | 0.921 | 0.921 |
| ASTM D-1238 | I2 g/10 min | | 0.54 | 0.52 | 1.07 | 1.08 | 0.82 | 0.64 | 0.26 | 0.14 | 0.15 |
| ASTM D-1238 | I2 Post Compounding g/10 min | | 0.53 | 0.53 | 1.08 | 1.08 | 0.82 | 0.62 | 0.29 | 0.17 | 0.20 |
| ASTM D-1238 | I5 g/10 min | | 2.06 | 2.10 | 4.08 | 4.07 | 3.04 | 2.52 | 1.23 | 0.72 | 0.73 |
| ASTM D-1238 | I10 g/10 min | | 8.51 | 8.21 | 15.41 | 15.25 | 11.62 | 9.76 | 5.35 | 3.49 | 3.61 |
| ASTM D-1238 | I21 g/10 min | | 39.61 | 39.97 | 74.70 | 72.59 | 54.93 | 48.09 | 29.13 | 20.91 | 21.12 |
| | MFR I10/I2 | | 16.0 | 15.4 | 14.3 | 14.1 | 14.2 | 15.8 | 18.4 | 20.5 | 18.0 |
| | MFR I21/I2 | 100 | 74 | 75 | 69 | 67 | 67 | 78 | 100 | 123 | 106 |
| | MFR I5/I2 | | 3.9 | 3.9 | 3.8 | 3.8 | 3.7 | 4.1 | 4.3 | 4.2 | 3.6 |
| | MFR I21/I5 | | 19.3 | 19.1 | 18.3 | 17.8 | 18.1 | 19.1 | 23.6 | 29.0 | 29.1 |

TABLE 14

Comparative Samples Rheological Properties & IR Structure Data

| | C4 V 1 | C4 V 2 | C4 V 3 | C4 V 4 | C4 V 5 | C4 V 6 | C4 V 7 | C4 V 8 | C4 V 9 |
|---|---|---|---|---|---|---|---|---|---|
| Viscosity Ratio [10 − 2/10 + 2] (rad/rad) | 36 | 35 | 27 | 26 | 27 | 16 | 59 | 80 | 82 |
| Tan Delta Ratio [10 − 2/10 + 2] (rad/rad) | 3.03 | 3.12 | 3.58 | 3.63 | 3.54 | 2.7 | 2.41 | 2.45 | 2.48 |
| Trans/1000 carbons | 0.14 | 0.12 | 0.18 | 0.18 | 0.14 | 0.14 | 0.13 | 0.13 | 0.14 |
| Vinyls/1000 carbons | 0.82 | 0.82 | 0.98 | 0.98 | 0.86 | 0.87 | 0.86 | 0.85 | 0.87 |
| Methyls/1000 carbons | 20.5 | 21.5 | 22.2 | 21.3 | 20.5 | 20.4 | 17.1 | 17 | 17.7 |

TABLE 15

Comparative Samples DSC Data

| | C4 V 1 | C4 V 2 | C4 V 3 | C4 V 4 | C4 V 5 | C4 V 6 | C4 V 7 | C4 V 8 | C4 V 9 |
|---|---|---|---|---|---|---|---|---|---|
| Melting point (° C.) | 117.91 | 117.73 | 118.43 | 117.87 | 117.5 | 118.07 | 118.7 | 118.87 | 118.86 |
| Heat of fusion (J/g) | 141.1 | 140.5 | 143.4 | 140.1 | 139.8 | 142.7 | 147.2 | 147.4 | 143.7 |
| Crystal, point (° C.) | 105.79 | 105.52 | 106.15 | 106 | 105.12 | 105.7 | 106.76 | 107.15 | 106.62 |
| Heat of Crystal. (J/g) | 139.3 | 138.5 | 140 | 139.4 | 137 | 140.6 | 144 | 144.7 | 142.2 |

TABLE 16

Comparative Samples ATREF & GPC Data

|  | C4 V 1 | C4 V 2 | C4 V 3 | C4 V 4 | C4 V 5 | C4 V 6 | C4 V 7 | C4 V 8 | C4 V 9 |
|---|---|---|---|---|---|---|---|---|---|
| ATREF |  |  |  |  |  |  |  |  |  |
| High Density Fract. (%) | 4.1 | 6 | 6.1 | 1.8 | 2.2 | 5.5 | 9.7 | 7.1 | 9.7 |
| Temp Min (° C.) | 94 | 92.7 | 93.8 | 96 | 96 | 93.2 | 92.3 | 94.3 | 92.3 |
| Purge (%) | 20.6 | 20.7 | 14.2 | 30.2 | 17.8 | 17.9 | 17.3 | 10.7 | 10.3 |
| SCB % (calculated) | 75.3 | 73.3 | 79.7 | 68 | 80 | 76.6 | 73 | 82.2 | 80 |
| Mv Ave | 68,919 | 46,970 | 73,215 | 72,758 | 69,812 | 75,373 | 8,121 | 92,848 | 83,881 |
| SCB MV | 64,041 | 38,993 | 78,564 | 84,291 | 67,558 | 72,583 | 79,393 | 91,648 | 85,969 |
| Purge Mv | 87,721 | 77,528 | 40,896 | 46,102 | 80,219 | 88,170 | 89,907 | 102,865 | 66,269 |
| Conv. GPC |  |  |  |  |  |  |  |  |  |
| Mn | 11,290 | 11,430 | 8,230 | 8,470 | 10,630 | 10,320 | 11,200 | 13,150 | 11,140 |
| Mw | 108,640 | 101,880 | 97,110 | 100,020 | 104,180 | 102,490 | 107,150 | 124,110 | 120,080 |
| Mz | 524,000 | 424,900 | 583,100 | 553,600 | 517,600 | 533,600 | 388,500 | 611,600 | 589,100 |
| Mw/Mn | 9.6 | 8.9 | 11.8 | 11.8 | 9.8 | 9.9 | 9.6 | 9.4 | 10.8 |
| Abs. GPC |  |  |  |  |  |  |  |  |  |
| Mn | 13,165 | 13,453 | 9,970 | 9,559 | 11,905 | 11,894 | 13,256 | 14,534 | 12,806 |
| Mw | 109,010 | 110,170 | 95,450 | 93,340 | 100,450 | 102,310 | 110,230 | 124,000 | 119,260 |
| Mw/Mn | 8.3 | 8.2 | 9.6 | 9.8 | 8.4 | 8.6 | 8.3 | 8.5 | 9.3 |
| Mz(BB) | 627,900 | 589,300 | 557,300 | 573,000 | 601,100 | 571,300 | 575,000 | 591,300 | 609,200 |
| Mz (abs) | 579,000 | 617,500 | 547,500 | 452,700 | 567,800 | 559,000 | 523,100 | 522,800 | 538,800 |
| Mz + 1 (BB) | 2,578,300 | 2,632,700 | 2,217,600 | 2,311,600 | 2,690,300 | 2,877,200 | 2,677,700 | 2,366,200 | 2,730,200 |
| Mz(abs)/Mw(abs) | 5.3 | 5.6 | 5.7 | 4.9 | 5.7 | 5.5 | 4.7 | 4.2 | 4.5 |
| Mz + 1(BB)/Mw (abs) | 23.7 | 23.9 | 23.2 | 24.8 | 26.8 | 28.1 | 24.3 | 19.1 | 22.9 |
| Comparable Mz/Mw | 0.9 | 0.9 | 0.8 | 0.8 | 0.9 | 0.9 | 0.9 | 0.1 | 0.9 |

TABLE 17

Comparative Molded Plaque Tensile Data

| Test/ Method |  | Indust. Require | C4 V 1 | C4 V 2 | C4 V 3 | C4 V 4 | C4 V 5 | C4 V 6 | C4 V 7 | C4 V 8 | C4 V 9 |
|---|---|---|---|---|---|---|---|---|---|---|---|
|  | Tensile (plaques) Type IV @ 2-ipm, 75-mil | Type IV, 2 - ipm |  |  |  |  |  |  |  |  |  |
| ASTM D-638 | Stress @ Break (psi) | >3800 | 2841 | 3011 | 2704 | 2664 | 2654 | 2881 | 3240 | 3370 | 3388 |
|  | % Elongation @ Break | >800% | 813 | 857 | 835 | 838 | 787 | 826 | 806 | 771 | 798 |
|  | Stress @ Yield (psi) |  | 1364 | 1367 | 1477 | 1424 | 1362 | 1397 | 1545 | 1588 | 1519 |
|  | % Elongation @ yield |  | 14.5 | 15.1 | 13.5 | 13.2 | 15.5 | 13.8 | 13.1 | 13.23 | 13.39 |

TABLE 18

Competitive Samples Physical Properties

| Test/Method | Product | Industry Requirement | MARLEX 7104 competitive | MARLEX K203* competitive | MARLEX K203* - 2nd sample competitive |
|---|---|---|---|---|---|
| ASTM D-792 | Density (g/10 min) | 0.939 max | 0.918 | 0.926 | 0.925 |
| ASTM 1D-238 | I2 g/10 min | | 0.34 | 0.14 | 0.14 |
| | I5 g/10 min | | 1.16 | 0.66 | 0.70 |
| | I10 g/10 min | | | 2.80 | 2.80 |
| | I21 g/10 min | | 13.53 | 14.76 | 12.40 |
| | MFR (I10/I2) | | | 19.4 | 20.7 |
| | MFR (I21/I2) | 100 | 40 | 103 | 92 |
| | MFR (I5/I2) | | 3.4 | 4.6 | 5.2 |
| | MFR (I21/I5) | | 11.7 | 22.3 | 17.6 |

*Tailored resins

TABLE 19

Competitive Samples Rheological Properties & IR Structure

| Product | MARLEX 7104 competitive | MARLEX K203 competitive | MARLEX K203 - 2nd sample competitive |
|---|---|---|---|
| Rheological Properties | | | |
| Viscosity Ratio [10 − 2/10 + 2] (rad/rad) | 22 | 70 | 73 |
| Tan_Delta Ratio [10 − 2/10 + 2] (rad/rad) | 3.8 | 2.62 | 2.52 |
| IR structure | | | |
| Trans/1000 carbons | 0.024 | 0.055 | |
| Vinyls/1000 carbons | 0.151 | 1.117 | |
| Methyls/1000 carbons | 12.8 | 4.16 | |

TABLE 20

Competitive Samples DSC Data

| Product Patent Sample Type | MARLEX 7104 competitive | MARLEX K203 competitive | MARLEX K203 - 2nd sample competitive |
|---|---|---|---|
| Melting point (° C.) | 125.33 | 123.13 | 122.85 |
| Heat of fusion (J/g) | 127.6 | 146.9 | 156.4 |
| Crystallization point (° C.) | 112.42 | 111.3 | 111.91 |
| Heat of Crystallization (J/g) | 127.2 | 144.7 | 153.7 |

TABLE 21

Competitive Samples ATREF & GPC Data

| Product | MARLEX 7104 competitive | MARLEX K203 competitive |
|---|---|---|
| ATREF Results | | |
| High Density Fraction (%) | 30.6 | 9.8 |
| Temp Min (° C.) | 92.7 | 94.9 |
| Purge (%) | 24.1 | 19.1 |
| SCB % (calculated) | 45.3 | 71.1 |
| Mv Ave | 74,479 | 82,597 |
| SCB MV | 76,431 | 84,902 |
| Purge Mv | 68,332 | 72,835 |
| Conventional GPC | | |
| Mn | 31,170 | 8,930 |
| Mw | 135,730 | 135,210 |
| Mz | 430,400 | 766,100 |
| Mw/Mn | 4.4 | 15.1 |
| Absolute GPC | | |
| Mn | 33,199 | 11,568 |
| Mw | 147,140 | 127,270 |
| Mw/Mn | 4.4 | 11.0 |
| Mz(BB) | 542,600 | 514,900 |
| Mz (abs) | 565,400 | 514,400 |
| Mz + 1 (BB) | 1,290,300 | 1,173,100 |
| Mz(abs)/Mw(abs) | 3.8 | 4.0 |
| Mz + 1(BB)/Mw(abs) | 8.8 | 9.2 |
| Comparable Mz/Mw | 1.0 | 0.7 |

TABLE 22

Competitive Molded Plaque Tensile Data

| Test/Method | Product | Industry Requirement | MARLEX 7104 competitive | MARLEX K203 competitive |
|---|---|---|---|---|
| | Tensile (plaques) | Type IV, 2 - ipm | | |
| | Type IV @ 2-ipm, 75-mil | | | |
| ASTM D638 | Stress @ Break (psi) | >3800 | 4285 | 4028 |
| | % Elongation @ Break | >800% | 819 | 799 |
| | Stress @ Yield (psi) | | 1547 | 1842 |
| | % Elongation @ yield | | 13.3 | 11.9 |

TABLE 23

Competitive Black Sheet Tensile Data

| Test/Method | Product | Industry Requirement | MARLEX 7104 competitive | MARLEX K203 competitive |
|---|---|---|---|---|
| | Tensile (black) | Type IV, 2 - ipm pull rate | | |
| ASTM D5199 | Thickness [mils] | | 56 | 60 |
| ASTM D6693 | MD Stress @ Yield (ppi) | | 103 | 127 |
| | MD Stress @ Yield (PSI) | | 1839 | 2117 |
| | TD Stress @ Yield (ppi) | | 101 | 123 |
| | TD Stress @ Yield (PSI) | | 1804 | 2050 |
| | MD Stress @ Break (ppi) | | 292 | 277 |
| | MD Stress @ Break (PSI) | >3800 | 5214 | 4617 |
| | TD Stress @ Break (ppi) | | 289 | 283 |
| | TD Stress @ Break (PSI) | >3800 | 5161 | 4717 |
| | MD % Elongation @ Yield | | 22 | 19 |
| | TD % Elongation @ Yield | | 19 | 16 |
| | MD % Elongation @ Break | >800% | 1059 | 905 |
| | TD % Elongation @ Break | >800% | 1053 | 892 |

TABLE 24

Competitive Black Sheets Puncture & Tear Data

| Test/Method | Product | Industry Requirement | MARLEX 7104 competitive | MARLEX K203 competitive |
|---|---|---|---|---|
| ASTM 4833 | Puncture Resistance [lbs] | 84 lbf @60 mils | 106 | 113 |
| ASTM D1004 | MD Tear Strength [lbs] | 33 lbf @60 mils | 39 | 42 |
| | TD Tear Strength [lbs] | 33 lbf @60 mils | 38 | 42 |

TABLE 25

Competitive Natural Sheet Tensile Data

| Test/Method | | Industry Requirement | MARLEX 7104 | MARLEX K203 |
|---|---|---|---|---|
| | Tensile (natural) | Type IV, 2 - ipm pull rate | | |
| ASTM D5199 | Thickness [mils] | | 59 | 59 |
| ASTM D6693 | MD Stress @ Yield (ppi) | | 99 | 119 |
| | MD Stress @ Yield (PSI) | | 1678 | 2017 |
| | TD Stress @ Yield (ppi) | | 94 | 122 |
| | TD Stress @ Yield (SPI) | | 1593 | 2068 |
| | MD Stress @ Break (ppi) | | 294 | 276 |
| | MD Stress @ Break (PSI) | >3800 | 4983 | 4678 |
| | TD Stress @ Break (ppi) | | 313 | 276 |
| | TD Stress @ Break (PSI) | >3800 | 5305 | 4678 |
| | MD % Elongation @ Yield | | 18 | 21 |
| | TD % Elongation @ Yield | | 18 | 17 |
| | MD % Elongation @ Break | >800% | 1041 | 869 |
| | TD % Elongation @ Break | >800% | 1191 | 891 |

TABLE 26

Competitive Natural Samples Sheet Tensile Data

| Test/Method | | Industry Requirement | MARLEX 7104 competitive | MARLEX K203 competitive |
|---|---|---|---|---|
| ASTM D4833 | Puncture Resistance [lbs] | 84 lbf @60 mils | 114 | 112 |
| ASTM D1004 | MD Tear Strength [lbs] | 33 lbf @60 mils | 38 | 43 |
| | TD Tear Strength [lbs] | 33 lbf @60 mils | 40 | 41 |

Sheets formed from the inventive resins were tested and shown to meet the physical and mechanical properties for the Geosynthetic Research Institute standards for LLDPE sheets, GM-17. The achieved stress at break performance, around 4,000-psi to 4,900-psi, was well above the GM-17 requirement of 3,800-psi. The achieved elongation at break performance of around 940%-1,000%, was also well above the GM-17 requirements of >800%. The inventive sheets had improved tensile properties compared to the comparative examples. The inventive resins also had excellent melt strength, as evident by melt flow ratios, and in particular I21/I2, and/or rheology data, for example, viscosity ratio ($10^{-2}$ rad/100 rad). In addition, the inventive resins are not costly tailored (for example, peroxide or oxygen tailored) resins, but still have excellent melt strength, as indicated by high viscosity (0.10 rad/100 rad) ratios.

Inventive Polymers, Compositions and Tubing

The inventive samples were polymerized in a gas phase reactor, in the presence of a fluorinated and titanated CrO catalyst, activated at 825° C., with the appropriate gas compositions (C6/C2 ratios and the like). The inventive samples employed the use of 1-hexene as the comonomer. The granular polymer was removed from the reactor, cooled, and purged of residual hydrocarbons, such that no degradation occurred. The granular samples were then compounded, under mild compounding conditions, with the appropriate additives (primary and secondary types) and pelletized. Testing was conducted, per the test methods above, on pelleted resin, compression molded plaques, or extruded pipes.

Representative Polymerization

Figure 15:
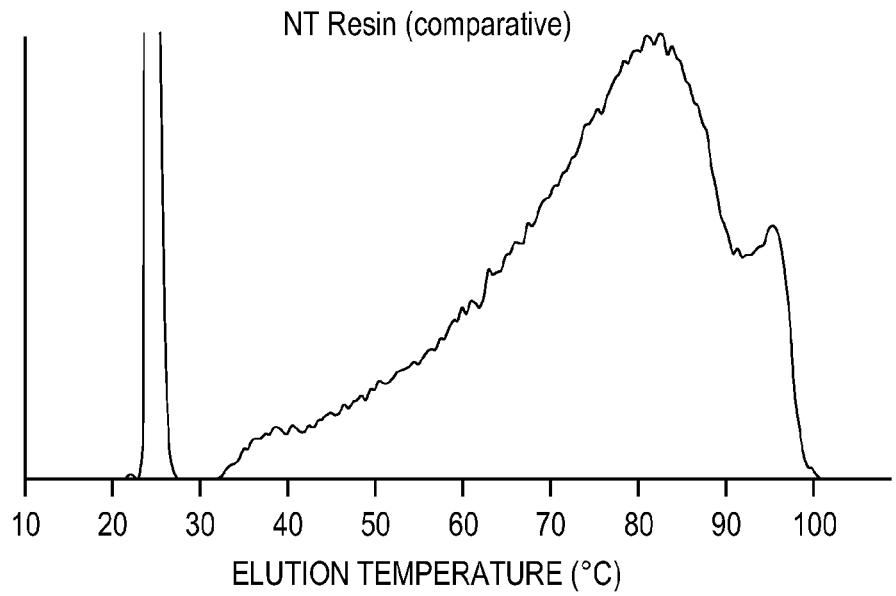
FIG. 15 depicts an ATREF profile of a comparative resin.
Figure 16:
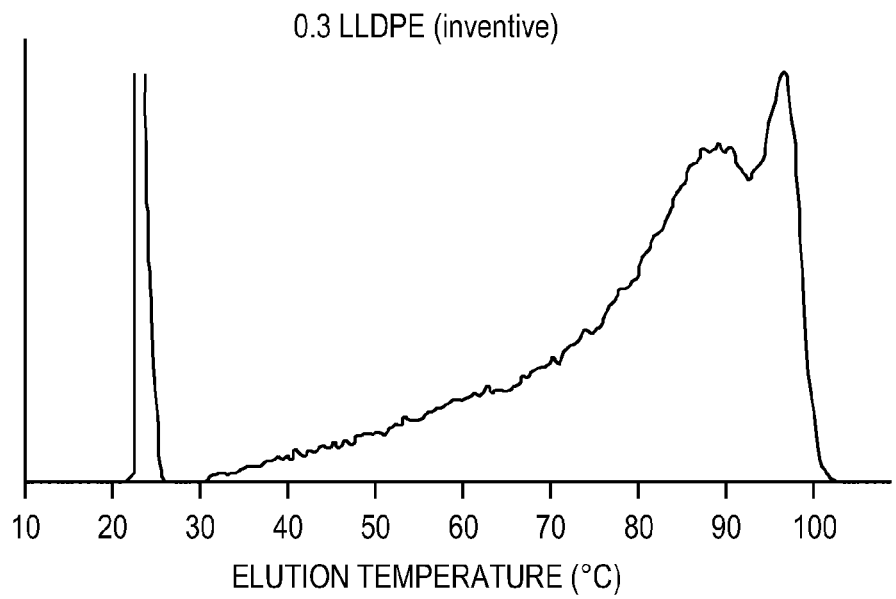
FIG. 16 depicts an ATREF profile of an inventive resin.

A gas phase fluidized bed reactor as described previously was used for the polymerization. Reaction conditions and some resin properties are listed in Table 27. Additional resin properties are listed in Tables 28-32. The inventive resin had good mechanical and rheological properties. FIG. 15 depicts an ATREF profile of the comparative "NT Resin," and FIG. 16 depicts an ATREF profile of the inventive "0.3 LLDPE Resin."

Figure 17:
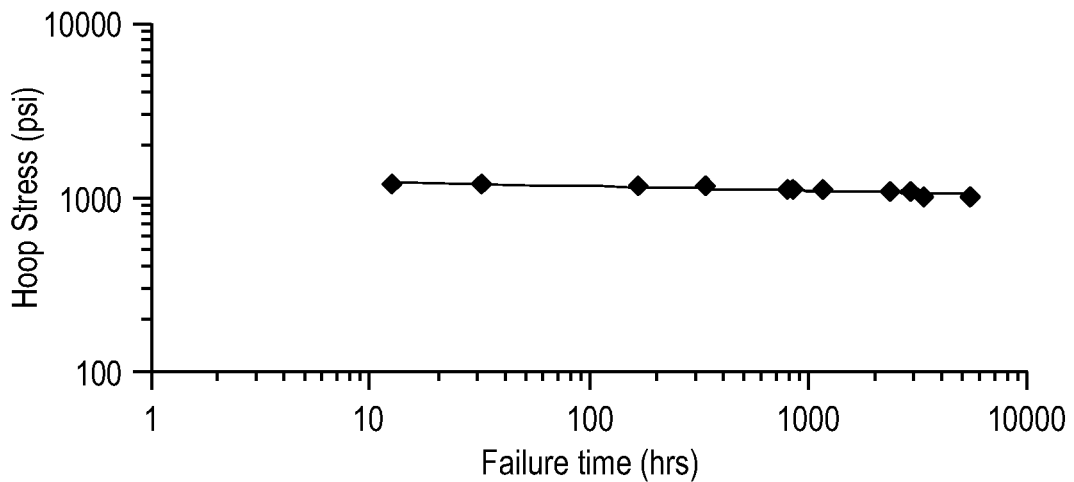
FIG. 17 depicts the "hoop stress versus failure time" data of a comparative resin.
Figure 18:
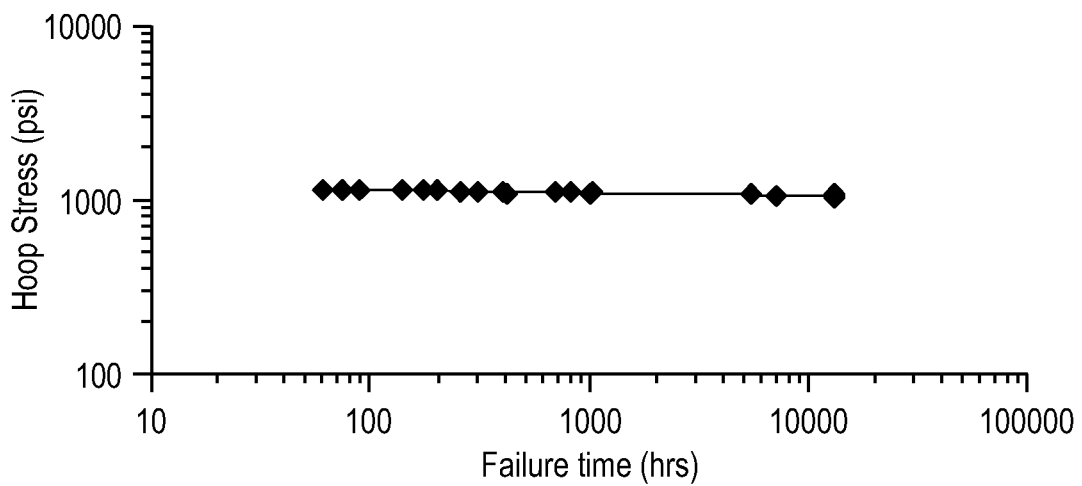
FIG. 18 depicts the "hoop stress versus failure time" data of an inventive resin.

Pipe extrusion conditions for the inventive resin are listed in Table 33. Pipe properties are listed in Tables 34 and 35. FIG. 17 depicts the "hoop stress versus failure time" data of the "NT Resin (12 pipes tested)", and FIG. 18 depicts the "hoop stress versus failure time" data of the "0.3 LLDPE Resin (35 pipes tested)." For each figure, some data points overlap due to similar failure times (stress rupture) at similar stress levels.

TABLE 27

1-Hexene Inventive Sample

| | | 0.3 LLDPE Resin | |
|---|---|---|---|
| Reaction | units | Avg | StDev |
| Fluidized Bed Temperature | °C. | 88.5 | 0.00 |
| Inlet Gas Temperature | °C. | 81.4 | 0.64 |
| Total Pressure | psig | 348 | 0.3 |
| C2H4 Partial Pressure | psia | 250 | 0.2 |
| H2 Feed Rate | milli-lb/hr | 61.3 | 0.85 |
| O2 Add-Back Feed Rate | milli-lb/hr | 0.00 | 0.000 |
| C2H4 Feed Rate | lb/hr | 63.3 | 1.01 |
| C6H12 Feed Rate | lb/hr | 4.53 | 0.092 |
| i-C5H12 Feed Rate | lb/hr | 0.95 | 0.013 |
| TEAL Feed Rate | mg/hr | 8.61 | 0.099 |
| Catalyst Cr Loading | wt % | 0.20 | |
| Catalyst Feed Rate | g/hr | 4.02 | 0.254 |
| C2H4 Vent Rate | lb/hr | 27.2 | 1.77 |
| C6H12 Vent Rate | lb/hr | 2.345 | 0.2561 |
| C6H12 Resin Solubility | lb/100 lb | 1.48 | 0.07 |
| O2/C2 Feed Ratio | ppbv | 0.0 | 0.00 |
| C6/C2 Feed Ratio | lb/lb | 0.0715 | 0.00237 |
| No Vent C6/C2 Feed Ratio | lb/lb | 0.0604 | 0.00099 |
| TEAL/Cr Feed Ratio | mol/mol | 0.490 | 0.0362 |
| H2/C2 Composition Ratio | mol/mol | 0.050 | 0.0001 |
| C6/C2 Composition Ratio | mol/mol | 0.0287 | 0.00130 |
| i-C5 Composition | mol % | 0.17 | 0.024 |
| Average Static | avg volts | −43 | 1 |
| Static Bandwidth | 6σ volts | 72 | 7 |
| Superficial Gas Velocity | ft/sec | 1.73 | 0.004 |
| Fluidized Bulk Density | lb/ft3 | 17.9 | 0.26 |
| Fluidized Bed Weight | lb | 127 | 0.8 |
| Fluidized Bed Height (10 ft Rx) | ft | 7.42 | 0.141 |
| Production Rate | lb/hr | 37.8 | 2.85 |
| Residence Time | hr | 3.37 | 0.242 |
| Space Time Yield | lb/hr/ft3 | 5.33 | 0.315 |
| Total Monomer Ratio | lb/lb | 1.80 | 0.116 |
| No Vent Total Monomer Ratio | lb/lb | 1.015 | 0.0007 |
| Catalyst Productivity | Mlb/lb Cat | 4.26 | 0.105 |
| Chrome Productivity | MMlb/lb Cr | 2.13 | 0.053 |

TABLE 28

Density and Melt Index

| Test/Method | | | NT Resin comparison | 0.3 Resin inventive |
|---|---|---|---|---|
| ASTM D-792-98 | Density [g/cm$^3$] | | 0.9198 | 0.927 |
| ASTM D-1238-04 | I2 g/10 min @ 190 C. | | 0.62 | 0.25 |
| | I10 g/10 min @ 190 C. | | 10.1 | 4.7 |
| | I21 g/10 min @ 190 C. | | 48 | 20 |
| | MFR (I10/I2) | | 16 | 19 |
| | MFR (I21/I2) | | 78 | 80 |

TABLE 29

Rheological Properties & IR Structure

| Test/Method | | NT Resin* comparison | 0.3 Resin inventive |
|---|---|---|---|
| Rheological Properties | | | |
| | Viscosity Ratio [10^−2/10^+2] from DMS | 40 | 69 |
| | Tan Delta Ratio [10^−2/10^+2] from DMS | 3.0 | 2.6 |
| | Melt Strength [cN] | 7.5-8 | 8-8.5 |
| IR structure | | | |
| D-6264-98 | Trans/1000 carbons | 0.080 | 0.101 |
| D-6264-98 | Vinyls/1000 carbons | 0.92 | 0.95 |
| D-2238-92 | Methyls/1000 carbons | 16.7 | 10.8 |

*NT Resin is a ethylene/butene copolymer (LLDPE) prepared by a chrome catalyst (this resin is commercially available as FINGERPRINT DFDA-7510 NT Linear Low Density Polyethylene Resin, available from The Dow Chemical Company).

TABLE 30

ATREF and GPC Data

| | NT Resin | 0.3 Resin |
|---|---|---|
| ATREF | | |
| High Density Fraction [%] | 8.9 | 19 |
| Temp Minimum [° C.] | 91.8 | 93.5 |
| Purge [%] | 17.5 | 14.5 |
| SCB % [calculated] | 73.6 | 66.5 |
| Mv Ave | 53.504 | 56283 |
| SCB MV | 58358 | 58140 |
| Purge Mv | 30057 | 45332 |
| GPC | | |
| Conventional GPC | | |
| Mn | 7,620 | 9,430 |
| Mw | 105,540 | 124,160 |
| Mz | 575,200 | 594,500 |
| Mw/Mn | 13.9 | 13.2 |
| Absolute GPC | | |
| Mn | 7,434 | 9,717 |
| Mw | 103,180 | 128,640 |
| Mw/Mn | 13.9 | 13.2 |
| Mz(BB) | 536,400 | 559,200 |
| Mz (abs) | 529,400 | 547,100 |
| Mz + 1 (BB) | 1,540,900 | 1,508,600 |
| Mz(abs)/Mw(abs) | 5.13 | 4.25 |
| Mz + 1(BB)/Mw (abs) | 14.93 | 11.73 |

TABLE 31

DSC Data

| | | NT Resin | 0.3 Resin |
|---|---|---|---|
| DSC Results | Melting point (° C.) | 118.62 | 122.91 |
| | Heat of fusion (J/g) | 143.6 | 158.1 |
| | Crystallization point (° C.) | 106.43 | 112.02 |
| | Heat of Crystallization (J/g) | 144.2 | 157.6 |

TABLE 32

Tensile and Flexural Modulus Data - Molded Plaque

| | | NT Resin | 0.3 Resin |
|---|---|---|---|
| ASTM D638 | Tensile (plaques)-Type IV @ 2-ipm, 75-mil | | |
| | Avg thickness [in] | 0.0766 | 0.0792 |
| | Stress @ Break (psi) | 3251 | 4300 |
| | % Elongation @ Break | 713 | 565 |
| | Stress @ Yield (psi) | 1605 | 2129 |
| | % Elongation @ yield | 15.8 | 13.5 |
| | StdDev-Elongation At Break | 2.0056 | 0.2183 |
| | StdDev-Peak Load | 2.61 | 8.33 |
| | StdDev-Peak Stress | 136 | 430 |
| | StdDev-Strain At Break | 201 | 22 |
| | StdDev-Strain At Yield | 2.024 | 0.3892 |
| | StdDev-STRESS AT BREAK | 136 | 430 |
| | StdDev-Stress At Yield | 65 | 34 |
| | StdDev-Thickness | 0.0015 | 0.0013 |
| | StdDev-Width | 0 | 0 |
| ASTM D790-03 | Flexural Modulus [psi] | 57543 | 84044 |
| | StdDev-Flexural Modulus | 3102 | 3964 |

TABLE 33

Extrusion Parameters for "1-inch" DR 11 Pipe for 0.3 LLDPE Resin

| | |
|---|---|
| Die 1 (F.) | 390 F. |
| Zones 2, 3, 4, 5, 6, 7, 8 (F.) | Each at 390 F. |
| Barrel 1 (F.) | 380 F. |
| 2 (F.) | 385 F. |
| 3 (F.) | 390 F. |
| 4 (F.) | 390 F. |
| Melt (probe) (F.) | 395 F. |
| Processing Parameters | |
| Barrel Pressures (psi) | 1150 |
| Screw RPM | 81 |
| Motor Amps (%) | 64.5 |
| Puller Speed (ft/min) | 23.2 |
| Vacuum tank (F.) | 90 |
| Vacuum (inches Hg) | 11 |
| Quench bath #1 temp (F.) | 90 |
| Quench bath #2 temp (F.) | N/A |
| Rate (lbs/hr) | 238 |
| Gloss OD | Ok |
| ID | Ok |
| Die Plate Out | |
| Smoking | Normal |
| Odor | Normal |
| Pipe Dimension | |
| OD (in) | 1.317 |
| Wall (highest) (in) | 0.122 |
| Wall (lowest) (in) | 0.120 |

TABLE 34

ASTM D-2837 Regression of Baseline NT Resin

| | NT Resin |
|---|---|
| Average Pipe OD (inches) (n = 12) | 1.2 |
| Minimum Pipe wall thickness (inches) | 0.073 |
| SDR | 16.44 |
| SIDR | 14.44 |
| Test Temperature (deg. C.) | 23 |
| Number of Data points (# pipes tested) | 12 |
| Intercept on Y axis | 103.0 |
| Slope of the line | −32.9 |
| Regression equation | $\log(t) = (103.0) + (-32.9) \cdot \log(P)$ |
| Standard deviation of estimate | 0.4600288 |
| Correlation coefficient (r) | 0.843 |
| r2 value: | 0.711 |
| Ratio (LCL/LTHS) | 0.904 |
| Long Term Hyd. Stress (100,000 hours) | 952 |
| Lower Confidence Limit (97.5%) | 860 |
| Hydrostatic Design Basis | 800 | note:
both "r" and "r2" use predicted failure time vs. actual failure time.

TABLE 35

ASTM D-2837 Regression of 0.3 LLDPE Resin

| | 0.3 LLDPE (inventive) |
|---|---|
| Average Pipe OD (inches) (n = 35) | 1.317 |
| Minimum Pipe wall thickness (inches) | 0.120 |
| SDR | 10.98 |
| SIDR | 8.98 |
| Test Temperature (deg. C.) | 23 |
| Number of Data points (# pipes tested) | 35 |
| Intercept on Y axis | 137.8 |
| Slope of the line | −44.29 |
| Regression equation | $\log(t) = (137.8) + (-44.29) \cdot \log(P)$ |
| Standard deviation of estimate | 0.4233 |
| Correlation coefficient (r) | 0.494 |
| r2 value | 0.244 |
| Ratio (LCL/LTHS) | 0.978 |
| Long Term Hyd. Stress (100,000 hours) | 997 |
| Lower Confidence Limit (97.5%) | 975 |
| Hydrostatic Design Basis | 1000 | note:
both "r" and "r2" use predicted failure time vs. actual failure time.

The pipe extruded from the inventive resin was tested in the solid state, and shown to meet the "1,000-psi HDB at 23° C." performance category per ASTM D-2837, by achieving an LTHS of 997-psi. The inventive resin achieved the improvement, while maintaining excellent processability, evident by a melt flow ratio, $I_{21}/I_2$, of 80 and a viscosity ratio ($10^{-2}$ rad/100 rad) of 69, even at a high molecular weight, as indicated by $I_2$ of 0.25 g/10 min. This improved hydrostatic strength enables a more cost effective solution for tubing/piping systems, utilizing linear low density ethylene-based polymers, instead of costly post reactor or in-situ reactor blends or costly tailored resins.

Although the invention has been described in considerable detail in the preceding examples, this detail is for the purpose of illustration, and is not to be construed as a limitation on the invention as described in the following claims.

The invention claimed is:

1. An ethylene-based interpolymer comprising the following features:
   a) a density from 0.910 to 0.930 g/cc;
   b) a melt index (I2) from 0.1 to 0.5 g/10 min; and
   c) a high density fraction in an ATREF short chain branch distribution (SCBD) curve, eluting above 92° C., of greater than 10 percent to less than 28 percent of the total ATREF SCBD curve area.

2. The ethylene-based interpolymer of claim 1, wherein the interpolymer is polymerized using a chrome catalyst.

3. The ethylene-based interpolymer of claim 1, wherein the interpolymer has an absolute molecular weight distribution, Mw/Mn, greater than 11.5, as determined by GPC.

4. The ethylene-based interpolymer of claim 1, wherein the interpolymer has an I21/I2 ratio greater than, or equal to, 80.

5. The ethylene-based interpolymer of claim 1, wherein the interpolymer has an I21/I2 ratio less than, or equal to, 150.

6. A composition comprising the ethylene-based interpolymer of claim 1.

7. The composition of claim 6, wherein the composition comprises greater than 80 weight percent of the ethylene-based interpolymer, based on the total weight of the composition.

8. An article comprising at least one component formed from the composition of claim 6.

9. The article of claim 8, wherein then article has a percent elongation greater than, or equal to, 700 percent as determined by ASTM D-638, using a type IV specimen made form a compression molded plaque in accordance with ASTM D-4703 Annexes A1 - A7 and procedure C.

10. A composition comprising an ethylene-based interpolymer that comprises the following features:
   a) a density from 0.919 to 0.928 g/cc;
   b) a melt index (I2) from 0.1 to 0.8 g/10 min; and
   c) a high density fraction in an ATREF short chain branch distribution (SCBD) curve, eluting above 92° C., of greater than 10 percent to less than 28 percent of the total ATREF SCBD curve area.

11. The composition of claim 10, wherein the composition comprises greater than 80 weight percent of the ethylene-based polymer, based on the total weight of the composition.

12. An article formed from the composition of claim 10.

13. A hollow tube comprising at least one component formed from a composition comprising an ethylene-based interpolymer that comprises the following features:
   a) a density from 0.919 to 0.928 g/cc;
   b) a melt index (I2) from 0.1 to 0.8 g/10 min; and
   c) a high density fraction in an ATREF short chain branch distribution (SCBD) curve, eluting above 92° C., of greater than 10 percent to less than 28 percent of the total ATREF SCBD curve area; and
wherein the tube has a hydrostatic design basis (HDB) of at least 1000-psi at 23° C. per ASTM D-2837 regression method.

14. The tube of claim 13, wherein the interpolymer has an I21/I2 ratio greater than, or equal to, 50.

15. The tube of claim 13, wherein the interpolymer has an I21/I2 ratio less than, or equal to, 120.

16. The ethylene-based interpolymer of claim 1, wherein the interpolymer has an I21/I2 ratio greater than, or equal to, 60.

17. The ethylene-based interpolymer of claim 1, wherein the interpolymer has an I21/I2 ratio greater than, or equal to, 70.

18. The ethylene-based interpolymer of claim 1, wherein the interpolymer has an I21/I2 ratio greater than, or equal to, 80.

19. The ethylene-based interpolymer of claim 1, wherein the interpolymer has a viscosity ratio ($\eta 0.01/\eta 100$) ratio greater than, or equal to, 44.

* * * * *